US010715552B2

(12) United States Patent
Tsironis

(10) Patent No.: US 10,715,552 B2
(45) Date of Patent: Jul. 14, 2020

(54) ENABLING USER DEFINITION OF ANOMALY ACTION RULES IN A NETWORK SECURITY SYSTEM

(71) Applicant: Splunk Inc., San Francisco, CA (US)

(72) Inventor: George Tsironis, Santa Clara, CA (US)

(73) Assignee: SPLUNK INC., San Francisco, CA (US)

( * ) Notice: Subject to any disclaimer, the term of this patent is extended or adjusted under 35 U.S.C. 154(b) by 180 days.

(21) Appl. No.: 15/582,734

(22) Filed: Apr. 30, 2017

(65) Prior Publication Data

US 2018/0316727 A1 Nov. 1, 2018

(51) Int. Cl.
H04L 29/06 (2006.01)

(52) U.S. Cl.
CPC .......... *H04L 63/20* (2013.01); *H04L 63/0263* (2013.01); *H04L 63/1425* (2013.01); *H04L 63/1441* (2013.01)

(58) Field of Classification Search
CPC . H04L 63/20; H04L 63/0263; H04L 63/1425; H04L 63/1441
USPC .......................................................... 726/1
See application file for complete search history.

(56) References Cited

U.S. PATENT DOCUMENTS

| 7,523,016 B1* | 4/2009 | Surdulescu | ........... | G06F 21/316 |
| | | | | 702/185 |
| 9,317,679 B1 | 4/2016 | Bhatkar et al. | | |
| 9,413,722 B1 | 8/2016 | Ahn et al. | | |
| 9,922,540 B1 | 3/2018 | Hutz | | |
| 2003/0177394 A1* | 9/2003 | Dozortsev | ............... | G06F 21/52 |
| | | | | 713/187 |
| 2005/0262236 A1* | 11/2005 | Schachtely | ........ | G05B 23/0227 |
| | | | | 709/224 |
| 2007/0289013 A1* | 12/2007 | Lim | ...................... | G06F 21/552 |
| | | | | 726/22 |
| 2014/0123280 A1* | 5/2014 | Kedma | ................... | G06F 21/56 |
| | | | | 726/23 |
| 2014/0181975 A1* | 6/2014 | Spernow | ............... | G06F 21/562 |
| | | | | 726/23 |
| 2016/0092683 A1* | 3/2016 | Mityagin | .............. | G06F 21/561 |
| | | | | 726/24 |
| 2017/0126740 A1 | 5/2017 | Bejarano et al. | | |
| 2017/0208093 A1 | 7/2017 | Williams et al. | | |
| 2018/0124082 A1* | 5/2018 | Siadati | .................. | G06F 21/552 |
| 2018/0124114 A1* | 5/2018 | Woods | .................... | H04L 63/20 |

OTHER PUBLICATIONS

NPL Search Results (Year: 2020).*

(Continued)

*Primary Examiner* — Syed A Zaidi
(74) *Attorney, Agent, or Firm* — Perkins Coie LLP

(57) ABSTRACT

The disclosed embodiments include a method performed by a computer system. The method includes receiving first user input defining a filter of an anomaly action rule, the filter defining at least one of an attribute of an anomaly or an attribute of a computer network entity. The method also includes receiving second user input defining an action of the anomaly action rule. The method further includes generating the anomaly action rule based on the first user input and the second user input, wherein the anomaly action rule causes performance of the action upon detecting an anomaly on the computer network that satisfies the anomaly action rule.

29 Claims, 28 Drawing Sheets

(56) References Cited

OTHER PUBLICATIONS

U.S. Appl. No. 15/582,736, of Tsironis, G. filed Apr. 30, 2017.
Non-Final Office Action dated Dec. 14, 2018 for U.S. Appl. No. 15/582,736, of Tsironis, G. filed Apr. 30, 2017.
Final Office Action dated Jun. 20, 2019 for U.S. Appl. No. 15/582,736 of Tsironis, filed Apr. 30, 2017.
Advisory Action dated Sep. 13, 2019 for U.S. Appl. No. 15/582,736 of Tsironis, filed Apr. 30, 2017.

\* cited by examiner

| ANOMALY | MODEL | VIEW | VIEW FIELDS |
|---|---|---|---|
| BLACKLISTED DOMAIN | FIXED LOGIC | HTTP | EXTERNAL URL, EXTERNALACTION |
| BLACKLISTED IP ADDRESS | FIXED LOGIC | NETWORK | NETWORK, DESTINATIONI.P, AUTHENTICATION.SOURCEI.P, EXTERNALACTION |
| DOMAIN NAME ANOMALY | HTTP MALWARE | HTTP | EXTERNALURL |
| EXTERNAL ALARM | EXTERNAL ALARM | EXTERNAL ALARM | EVCTG, EVSUBCTG, HOSTNAME, CATEGORY, FILE.NAME, ALERT.EXPLANATION.MALWARE-DETECTED.MALWARE.NAME, EXTERNALACTION |
| MACHINE GENERATED BEACON | HTTP MACHINE GENERATED BEACON | HTTP | EXTERNALURL, SOURCEI.P, DESTINATIONI.P, HTTPCLIENTI.P, PEERINGHOST, BYTESSENT, BYTESRECEIVED, HTTPMETHOD, HTTPCONTENT TYPE, HTTPREQUEST, HTTPAPPLICATIONTYPE, EXTERNALACTION, RISKCLASSIFICATION |
| MACHINE GENERATED BEACON | IP MACHINE GENERATED BEACON | FIREWALL | PROTOCOL, EXTERNALACTION, RISKCLASSIFICATION |
| MALICIOUS DOMAIN | HTTP MALWARE | HTTP | EXTERNALURL, HTTPREFERRER, SOURCEI.P, DESTINATIONI.P, BYTESSENT, BYTESRECEIVED, HTTPMETHOD, HTTPCONTENTTYPE, HTTPREQUEST, HTTPAPPLICATIONTYPE, BROWSERINFO, RISKCLASSIFICATION |
| UNUSUAL WEB BROWSER | RARE CATEGORICAL | HTTP | BROWSERINFO |
| UNUSUAL NETWORK ACTIVITY | RARE CATEGORICAL | FIREWALL | SOURCEZONENAME, DESTINATIONZONENAME, POLICYNAME, PROTOCOL |
| UNUSUAL GEOLOCATION | RARE CATEGORICAL | AUTHENTICATION | GEO INFO FOR SOURCEI.P |
| EXPLOIT CHAIN | HTTP MALWARE | HTTP | EXTERNALURL, HTTPREFERRER, SOURCEI.P, DESTINATIONI.P, BYTESSENT, BYTESRECEIVED, HTTPMETHOD, HTTPCONTENTTYPE, HTTPREQUEST |
| EXCESSIVE DATA TRANSMISSION | TIMESERIES, OUTLIERS | NETWORK | BYTESSENT, BYTESRECEIVED |

FIG. 2A

| ANOMALY | MODEL | VIEW | VIEW FIELDS |
|---|---|---|---|
| MULTIPLE DLP ALARMS | TIMESERIES | DLP | DLP TYPE, DLPSTATUS, DLPPREVENTIONSTATUS |
| MULTIPLE AWS INSTANCE OPERATIONS | TIMESERIES | | AWS CLOUDTRAIL EVENTCLASS |
| MULTIPLE OUTGOING CONNECTIONS MULTIPLE SESSIONS DENIAL | TIMESERIES | NETWORK | DESTINATIONIP, SOURCEIP, EXTERNALACTION |
| MULTIPLE LOGIN ERRORS, MULTIPLE LOGINS | TIMESERIES | AUTHENTICATION | STATUS, AUTHLOGINTYPE, AUTHTYPE, AUTHERROR |
| UNUSUAL AD ACTIVITY | CONTENT BASED | AUTHENTICATION | EVID, STATUS, AUTHLOGINTYPE, AUTHTYPE, AUTHERROR |
| UNUSUAL DLP ALARM | CONTENT BASED | DLP | DLPTYPE, DLPSTATUS, DLPPREVENTIONSTATUS |
| LAND SPEED VIOLATION | FIXED LOGIC | AUTHENTICATION | GEO INFO FOR SOURCEIP |
| UNUSUAL MACHINE ACCESS | COLLABORATIVE FILTERING | AUTHENTICATION NETWORK | EVID, STATUS, AUTHLOGINTYPE, AUTHTYPE, AUTHERROR DESTINATIONIP |
| UNUSUAL ACTIVITY TIME, UNUSUAL VPN SESSION DURATION | OUTLIERS | AUTHENTICATION NETWORK | EVID SESSIONDURATION |
| EXTERNAL WEBSITE ATTACK | FIXED LOGIC | HTTP | EXTERNALURL, HTTPCLIENTIP |
| UNUSUAL ACTIVITY SEQUENCE, UNUSUALLY FAST ACTIVITY | PST | AUTHENTICATION | EVID |
| WEBSHELL ACTIVITY | WEBSHEL | HTTP | EXTERNALURL, HTTPREFERRER, HTTPCLIENTIP, BYTESSENT, BYTESRECEIVED, HTTPMETHOD, HTTPCONTENTTYPE, HTTPREQUEST, HTTPAPPLICATIONTYPE, BROWSERINFO |

Custom Threats

| Threat Rules | | | | | |
|---|---|---|---|---|---|
| Name | Threat Type | Threats | Added By | Date Added | Enabled |
| Potential Flight Risk Exfiltration<br>Looks for Flight Risk users who may be exfiltrating sensitive data. | Exfiltration | 0 | admin | Mar 4, 2017 | |
| Flight Risk Exfiltration<br>Looks for Flight Risk users who are exfiltrating sensitive data. | Exfiltration | 0 | admin | Mar 4, 2017 | |
| Potential Phishing Attack<br>This looks for a possible phishing email followed by compromised account behavior, exploit attempts, or connectivity to malicious IP/Domains. | Possible Phishing | 0 | admin | Mar 4, 2017 | |
| Suspicious DLP<br>Looks for a combination of multiple suspicious data transfers along with suspicious data leakage in a short time | Exfiltration | 0 | admin | Mar 4, 2017 | |
| Compromised Web Server<br>Web Server Compromise | Compromised Web Server | 0 | admin | Mar 4, 2017 | |
| Internal Server with High Risk Anomalies<br>Internal server presenting several anomalies suggesting high risk. | Internal Server with High Risk | 0 | admin | Mar 4, 2017 | |
| User with High Risk Anomalies in a short interval<br>Users with several high risk anomalies occurring in a short time period. | User at High Risk | 3.9K | admin | Mar 4, 2017 | |
| Data Exfiltration after Account Takeover<br>Data Exfiltration after Account Takeover | Data Exfiltration after Account Takeover | 1 | admin | Mar 4, 2017 | |
| Watchlist User -- High Risk Anomalies<br>Watchlisted user with high risk anomalies. | User at High Risk | 0 | admin | Mar 4, 2017 | |
| Brute Force<br>Repeated login failures followed by suspicious behavior. | Compromised Account | 0 | admin | Mar 4, 2017 | |
| Compromised Account<br>Suspicious login followed by malicious behavior. | Compromised Account | 0 | admin | Mar 4, 2017 | |

FIG. 13

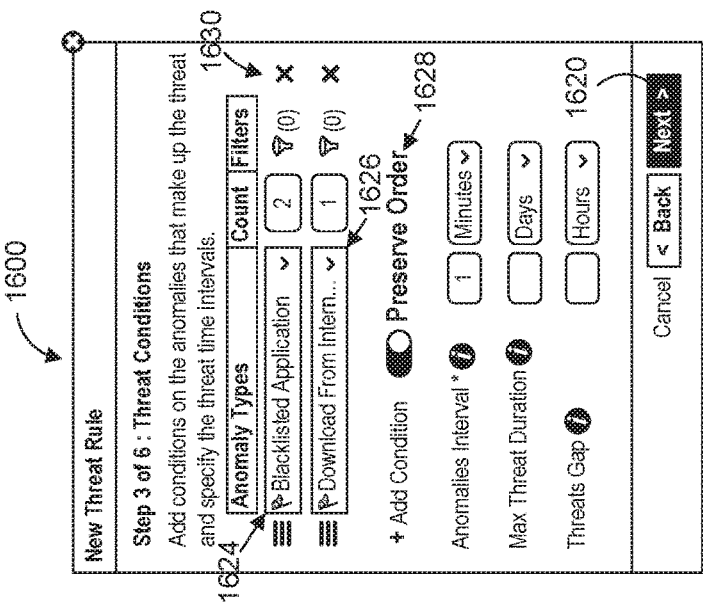
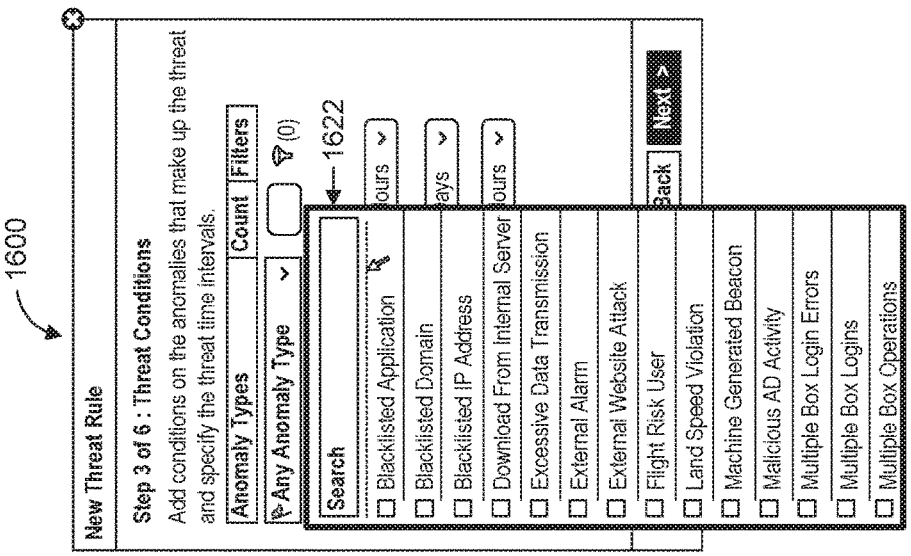
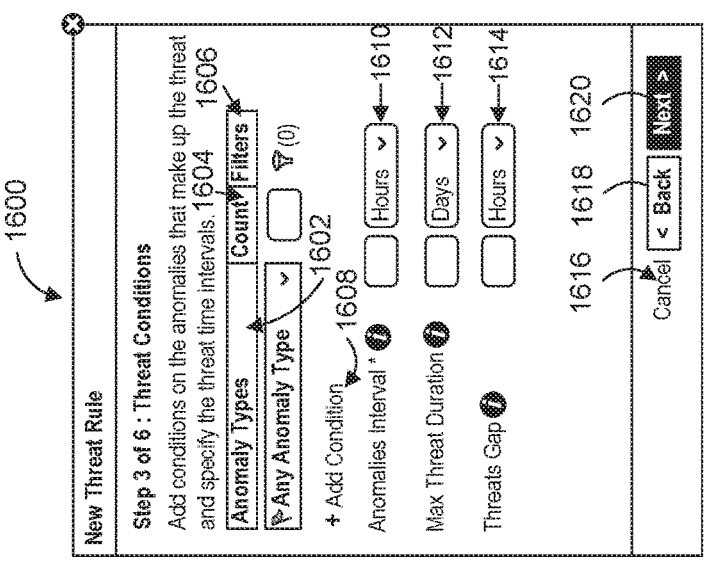
FIG. 16A
FIG. 16B
FIG. 16C

New Threat Rule

Step 6 of 6 : Rule Properties

Rule Name* ←—2002

| 2004

Rule Description ←—2006

2008

2010  2012  2014
Cancel  < Back  Next >

Edit Threat Rule

Step 4 of 5 : Generated Threats

Enter the properties of the threats generated by this rule.

Threat Score*

6

Custom Threat Type*

⦿ Use Existing Custom Threat Type

[ Exfiltration ⌄ ]

○ Create New Custom Threat Type

Threat Description*

A user has exhibited behaviors that indicate he/she may be considering leaving the organization, and this account has also been associated with suspicious data transfers.

Threat Recommendation

Cancel | < Back | Next >

FIG. 21

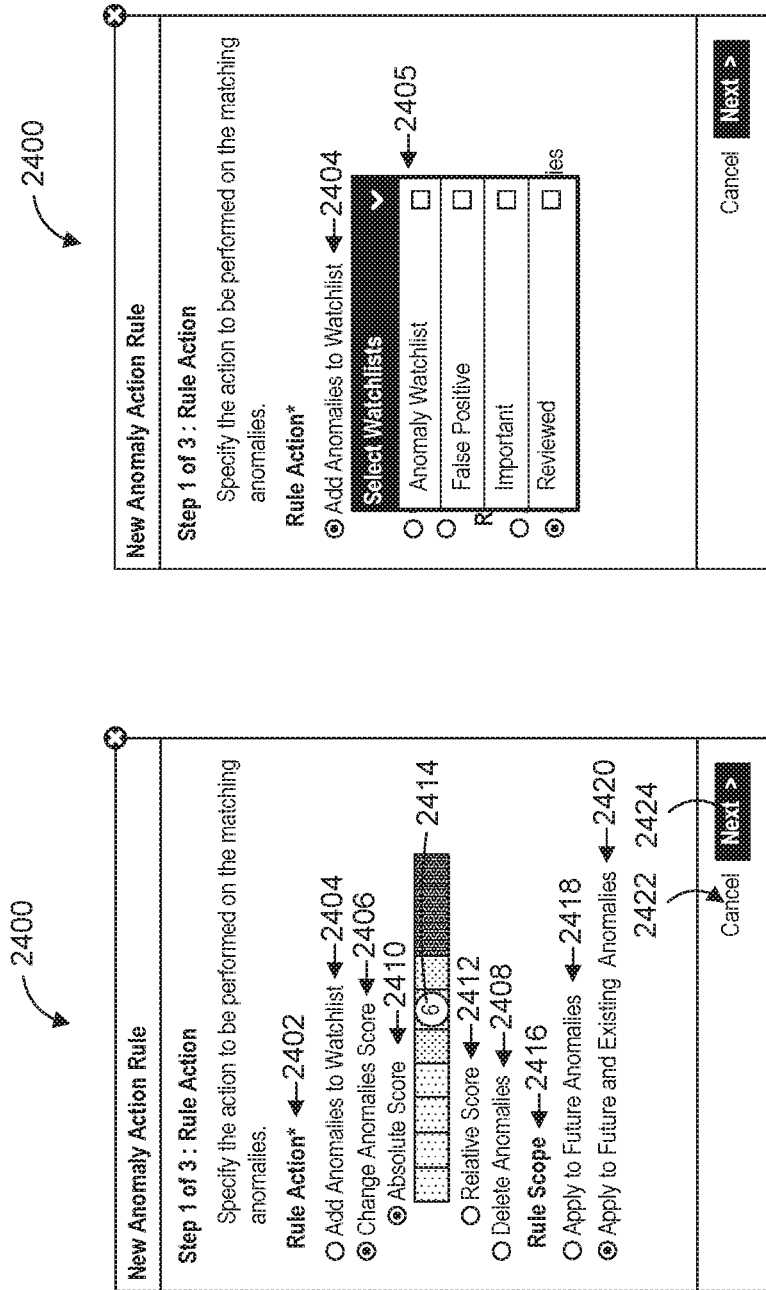

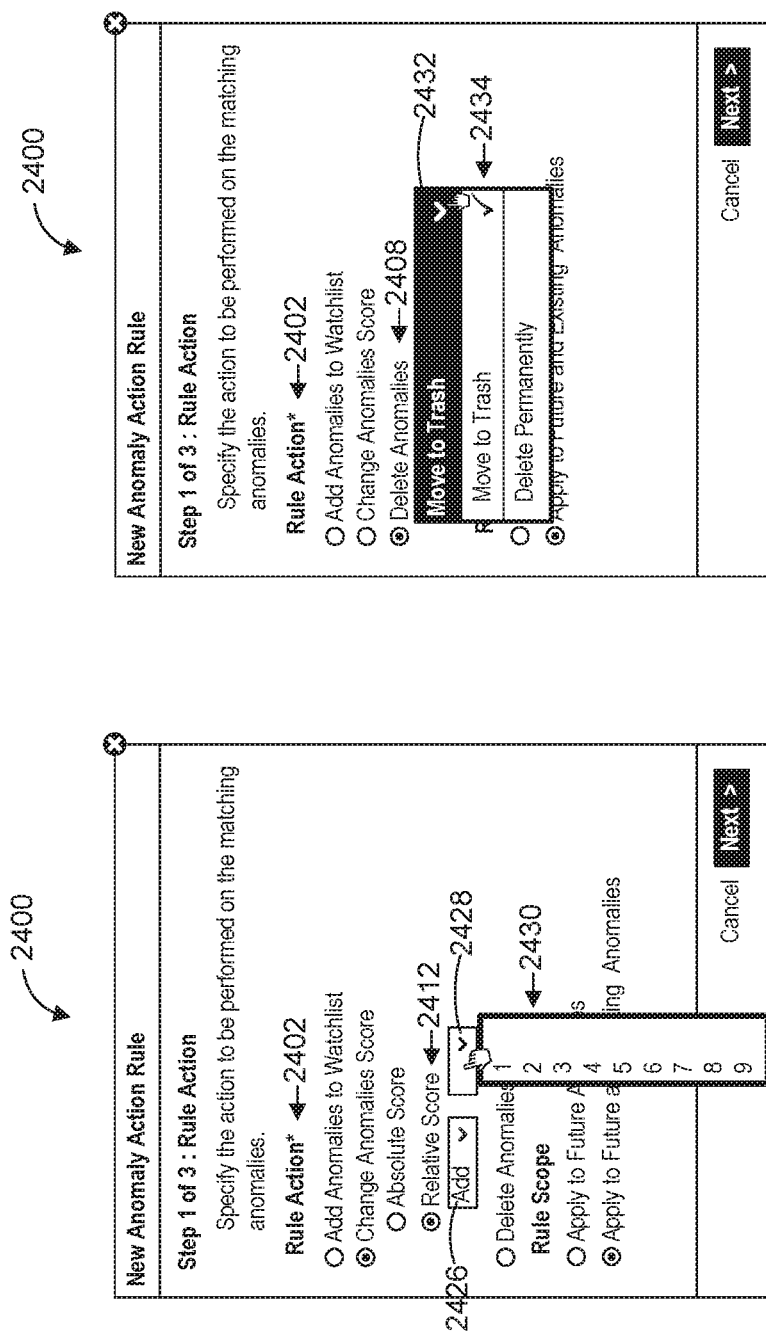

ENABLING USER DEFINITION OF ANOMALY ACTION RULES IN A NETWORK SECURITY SYSTEM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

At least one embodiment of the present disclosure pertains to network security tools, and more particularly, to intelligence generation by enabling users to customize anomaly action rules or threat rules for use in identifying security threats to a computer network.

BACKGROUND

Activity detection, both friendly and malicious, has long been a priority for computer network administrators. In known public and private computer networks, users employ devices such as desktop computers, laptop computers, tablets, smart phones, browsers, etc. to interact with others through computers and servers that are coupled to the network. Digital data, typically in the form of data packets, are passed along the network by interconnected network devices.

Malicious activities can cause harm to the network's software or hardware, and its users. Malicious activities may include unauthorized and/or unusual access or use of network resources and data. Network administrators seek to detect such activities, for example, by searching for patterns of behavior that are unusual or that otherwise vary from the expected use pattern of a particular entity, such as an organization or subset thereof, individual user, IP address, node or group of nodes in the network.

Network security tools (e.g., software, hardware) may be installed on nodes (e.g., servers) of a computer network to detect unusual activity. Such security tools monitor traffic over the computer network to perform malware detection, intrusion detection, detection of atypical or unusual behavior, and the like. An administrator may be alerted when such activities are detected so that the administrator can take actions to mitigate the effects of the activities. Existing security tools, however, use rigid, hard-coded logic to detect the same unusual activity in different computer networks. Yet unusual activities that pose a legitimate concern to the network of one organization may not pose any concern to the network of another organization. As a result, existing network security tools tend to be either under-inclusive to avoid overwhelming network administrators with false positives, or over-inclusive, which requires evaluation by a user of detected activities to determine whether a legitimate concern exists. Thus, existing security tools tend to be unreliable and/or ineffective.

BRIEF DESCRIPTION OF THE DRAWINGS

In the drawings:

FIG. 2A illustrates a portion of a table that includes example anomalies;

FIG. 2B illustrates the remaining portion of the table of FIG. 2A that includes example anomalies;

FIG. 11 is an illustrative view of an "Anomaly Details" user interface screen display;

FIG. 13 is an illustrative view of a "Custom Threats" user interface screen display;

FIG. 16A is an illustrative view of a third user interface screen display to define conditions for a custom threat rule;

FIG. 16B is another illustrative view of the third user interface screen display to define conditions for a custom threat rule;

FIG. 16C is another illustrative view of the third user interface screen display to define conditions for a custom threat rule;

FIG. 18A is an illustrative view of a fourth user interface screen display to define anomaly processing for a custom threat rule;

FIG. 18B is another illustrative view of the fourth user interface screen display to define anomaly processing for a custom threat rule;

FIG. 18C is another illustrative view of the fourth user interface screen display to define anomaly processing for a custom threat rule;

FIG. 19A is an illustrative view of a fifth user interface screen display to define properties of security threats of a custom threat rule;

FIG. 19B is another illustrative view of the fifth user interface screen display to define properties of security threats of a custom threat rule;

FIG. 19C is another illustrative view of the fifth user interface screen display to define properties of security threats of a custom threat rule;

FIG. 20 is an illustrative view of a sixth user interface screen display to define properties of a custom threat rule;

FIG. 21 is an illustrative view of the fourth user interface screen display for modifying properties of a custom threat rule;

FIG. 24A is an illustrative view of a first user interface screen display for creating an anomaly action rule;

FIG. 24B is another illustrative view of the first user interface screen display for creating an anomaly action rule;

FIG. 24C is another illustrative view of the first user interface screen display for creating an anomaly action rule;

FIG. 24D is another illustrative view of the first user interface screen display for creating an anomaly action rule;

DETAILED DESCRIPTION

The ensuing description provides exemplary embodiments only and is not intended to limit the scope, applicability, or configuration of the disclosure. Rather, the ensuing description of the exemplary embodiments will provide those skilled in the art with an enabling description for implementing a preferred exemplary embodiment. Various changes can be made in the function and arrangement of elements without departing from the spirit and scope as set forth in the appended claims.

In this description, references to "an embodiment," "one embodiment," or the like mean that the particular feature, function, structure or characteristic being described is included in at least one embodiment of the technique introduced herein. Occurrences of such phrases in this specification do not necessarily all refer to the same embodiment. On the other hand, the embodiments referred to are also not necessarily mutually exclusive.

1.0. General Overview

Modern data centers and other computing environments can comprise anywhere from a few host computer systems to thousands of systems configured to process data, service requests from remote clients, and perform numerous other computational tasks. During operation, various components within these computing environments often generate significant volumes of data. For example, data is generated by various components in the information technology (IT) environments, such as servers, sensors, routers, mobile devices, Internet of Things (IoT) devices, etc.

Analyzing and searching massive quantities of data presents a number of challenges. For example, a data center, servers, or network appliances may generate many different types and formats of data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

2.0. Operating Environment

Figure 1:
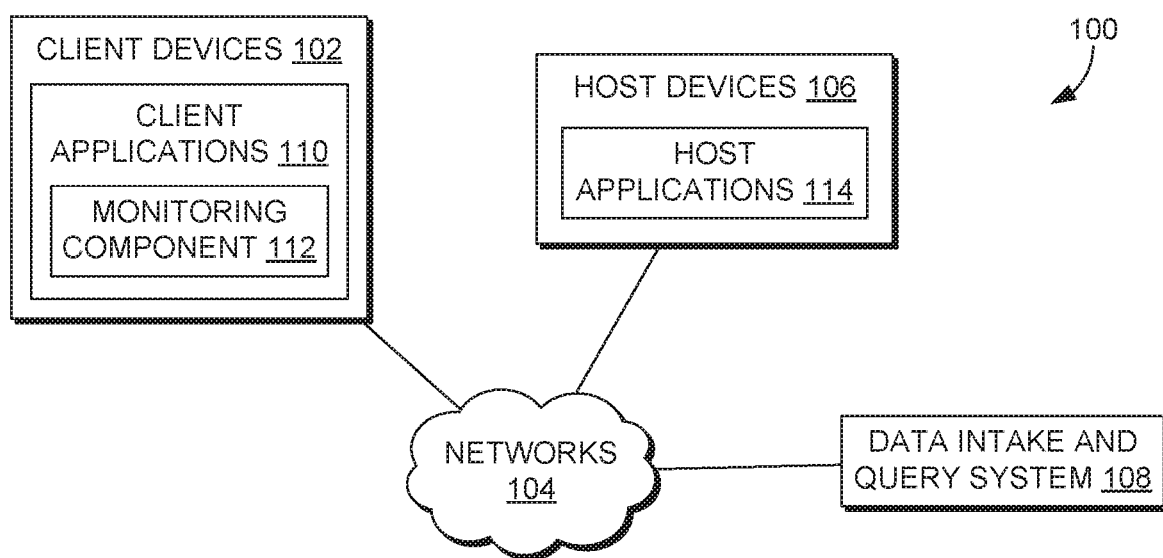
FIG. 1 illustrates a networked computer environment.
Figure 3:
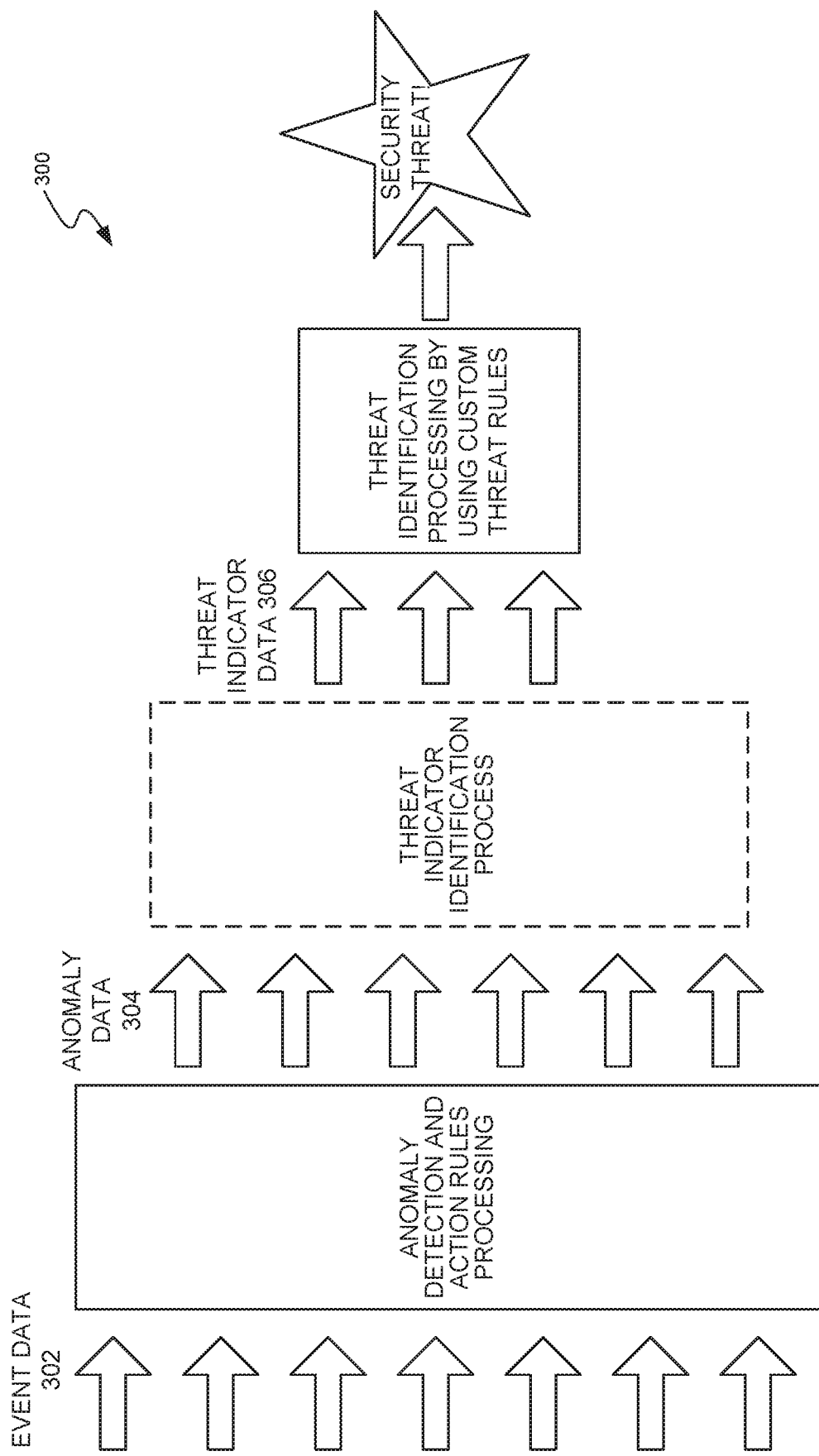
FIG. 3 is a block diagram illustrating a processing hierarchy of detecting anomalies, identifying threat indicators, and identifying threats.

FIG. 1 illustrates a networked computer system 100 in which an embodiment may be implemented. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, the system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine-generated data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In an embodiment, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In an embodiment, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In one embodiment, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some cases, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In an embodiment, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In an embodiment, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In an embodiment, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In an embodiment, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In an embodiment, the monitoring component 112 may also monitor and collect other device profile information including, for example, a type of client device, a manufacturer and model of the device, versions of various software applications installed on the device, and so forth.

3.0. Network Security Overview

In today's enterprises, security threats are caused by bad actors that are external to an enterprise or internal to the enterprise. For example, foreign actors routinely attempt to hack an enterprise to steal sensitive data for use in unlawful activity. Security tools such as firewalls are relatively effective at detecting suspicious activity from external sources and shutting down access when security threats are detected. On the other hand, security threats from trusted users of an enterprise often go undetected by existing security tools. For example, an authorized user may one day decide to steal sensitive data by periodically transferring that data to an external remote server. Because the user is trusted and the data is subtly leaked to the external remote server, a security tool may not detect the security threat.

Indeed, traditional security products often suffer from several major drawbacks, including the inability to detect unknown threats and insider threats, and the inability to scale and process huge amounts of data. Whether access is obtained by using compromised accounts/systems or by leveraging existing privileges to conduct malicious activities, nowadays attackers often do not need to employ additional malware. The patterns of these malicious activities vary dynamically, and attackers can almost always find ways to evade traditional security technologies, such as rules-driven malware detection, malicious file signature comparison, and sandboxing. Also, as the amount of the data increases, using human analysis to perform threat detection becomes increasingly expensive and time prohibitive, and such human analysis does not allow the threat to be responded to in a timely and effective manner.

The disclosed embodiments include a network security platform that can be implemented in a computer network such as a data processing system (e.g., including a data intake and query system). The disclosed network security platform can detect anomalies on a computer network and identify security threats to the computer network. A security threat to the network is identified from a detected pattern of one or more anomalies based on threat rules. The threat rules may be preconfigured, configurable, or non-configurable. In other words, some threat rules may be customizable by users of the network security platform.

For example, the disclosed embodiments include a user interface (UI) that displays a series of ordered displays (e.g., screens or views) with easy-to-use graphical controls that enable users to customize new threat rules or modify existing threat rules used to identify security threats to a computer network. Hence, the UI allows a user to provide definitions to define a specific scenario as a threat. The disclosed functionality provides flexibility for a user to define a threat rule to identify a particular scenario in anomalies that have already been detected, and be able to detect a security threat based on specified conditions or filters. The conditions or filters can apply across a wide range of data (e.g., anomalies, users, devices, applications, domains).

As used herein, an "anomaly" may refer to a detected variation from an expected pattern of behavior on the part of an entity. The variation may or may not constitute a security threat to the network. An anomaly can represent an event of possible concern, which may be actionable or warrant further investigation. An anomaly is an observable or detectable fact, or data representing such fact. An anomaly or a set of anomalies may be evaluated together and may result in a determination of a security threat or an indication of a security threat.

For example, an anomaly may represent entity specific behavior that deviates from the normal behavior for this entity as identified by a machine learning security system. As such, a threat rule operates on results of an entity oriented, unsupervised behavioral analysis process supported by machine learning with the goal of further cultivating and aggregating them into threats.

As used herein, a "security threat" or a "threat" are synonymous and may refer to an interpretation of one or more anomalies (e.g., a pattern of one or more anomalies) and/or threat indicators. Threat indicators and threats are escalations of events of concern. As an example of scale, hundreds of millions of packets of incoming data from various data sources may be analyzed to yield 100 anomalies, which may be further analyzed to yield 10 threat indicators, which may again be further analyzed to yield one or two threats. This manner of data scaling is one of the reasons the disclosed security techniques can provide anomaly and threat detection in a real-time manner.

The disclosed network security platform can also include anomaly action rules. An anomaly action rule can apply a "rule action" (also referred to as an "action") on one or more selected anomalies. The anomaly action rules can be applied in real-time; executed as part of an anomaly creation workflow and can apply their action rules on recently created anomalies, provided that they are selected based on a filter defined by the anomaly action rule. Hence, the anomaly action rules are part of a pre-processing stage through which all newly detected anomalies must pass before being registered and, for example, used to define the custom threat rules. In some embodiments, the anomaly action rules can be used in batch mode in order to process existing anomalies. For example, the disclosed embodiments include a UI that presents a series of screen views with easy-to-use graphical controls that enable users to customize anomaly action rules.

The disclosed techniques are not limited in applicability to security applications, security information and event management (SIEM) applications, or to any other particular kind of application. Additionally, the techniques introduced here are not limited to use with security-related anomaly and security threat detection; rather, the techniques can be employed with essentially any suitable behavioral analysis (e.g., fraud detection, pattern analysis, or environmental monitoring) based on, for example, machine data. In addition, the disclosed security techniques can benefit any processing systems that process or store structured, semi-structured, and/or unstructured data, especially when this data is stored in large volumes across nodes, which tends to be the case when with raw or minimally processed data.

For example, the disclosed embodiments can detect anomalies based on events that include raw data associated with specific points in time (e.g., time series data). Each event can be associated with a timestamp that can be derived from the raw data in the respective event, determined through interpolation between temporally proximate events having known timestamps, or determined based on other configurable rules for associating timestamps with events. During operation of a data intake and query system, ingested raw data is divided into blocks delineated by time frames. The blocks of raw data are indexed and stored as time-stamped events.

In some instances, the raw data is stored in a predefined format, where data items with specific data formats are stored at predefined locations in the data. For example, the raw data may include data stored as fields. In other instances, raw data may not have a predefined format; that is, the data is not at fixed, predefined locations, but the data does have repeatable patterns and is not random. This means that some raw data can comprise various data items of different data types that may be stored at different locations within the raw data. Each event can include a field that has a number of characters in length, and can be queried to extract their contents.

In some instances, raw data is stored as events that are indexed by timestamps but are also associated with predetermined data items. This structure is essentially a modification of database systems that require predetermining data items for subsequent searches. These systems can be modified to retain remaining raw data for subsequent re-processing for other predetermined data items. Specifically, the raw data can be divided into time-indexed segments. The events can be searched only for the predetermined data items during a search time, and re-processed later in time to re-index the raw data, and generate events with new predetermined data items. As such, a system can store raw data in a variety of structures. The disclosed network security platform can operate to detect anomalies and identify threats based any such data.

Existing security tools identify threats to networks based on anomalous patterns or behavior on the network as detected in accordance with threat rules. For example, an usual pattern of data being transferred to a remote server by a user that has never done so in the past, or even accessed such data in the past, constitutes an anomaly. A threat rule to the enterprise may be defined based on this type of anomaly. Network security platforms for different data processing systems predefine a number of threat rules based on a number of anomalies. When deployed, an enterprise can detect the predefined and non-configurable threats and anomalies. Hence, the definitions of threat rules based on anomalies are hardcoded into the network security platforms. Thus, when a network security platform is deployed on an enterprise, the enterprise is monitored based on a finite number of non-configurable threat rules.

Specifically, the threat rules are preconfigured with non-configurable logic defined based on anomalies. Hence, the non-configurable logic defines the one or more hardcoded threat rules that are executable by an enterprise to identify threats to that enterprise. The threat rules are applied to activity on the enterprise network to determine when certain activity poses a security threat. Similarly, any actions taken in response to detecting anomalies are also based on hardcoded rules. As a result, different enterprises use the same hardcoded rules to detect security threats, which results in unreliable and inaccurate identification of threats because the rules cannot be tailored for each individual enterprise.

In some instances, the hardcoded rules are applied to an enterprise routinely to account for any changes in activity. In other words, anomaly action rules or threat rules are refreshed by executing these preconfigured rules from time to time. For example, the rules may be executed periodically on enterprise activity occurring over a preconfigured timeframe such as every three days, based on the last four days of activity on the enterprise. In some instances, the consistency of threats is maintained by deleting all existing threats and re-computing them from scratch periodically (e.g., once per day) based on the non-configurable rules. This process is computationally intensive and not scalable for routinely processing a relatively large number of anomalies.

The disclosed embodiments overcome the aforementioned drawbacks with techniques for users to customize anomaly action rules and threat rules. When deployed, embodiments of the disclosed network security platform provides a UI that facilitates creating, modifying, or deleting rules by users. Accordingly, users of different enterprise networks can readily customize rules for their particular needs. This ensures reliable identification of potential or actual threats. By enabling customization of complex rules in an easy-to-use manner, the disclosed security techniques can avoid threats that are defined too broadly and reduce the risk of false positives, and can avoid defining threats too narrowly and reduce the risk of failing to identify threats. This further reduces the need for administrators to manually evaluate identified threats, to determine whether a legitimate threat actually exists.

In particular, the embodiments introduced here employ a variety of security techniques and mechanisms for customizing threats based on anomalous activity detection in a networked environment in ways that are more insightful and reduce the number of false positives compared to existing techniques. The disclosed customizable security platform is "big data" driven and can employ a number of machine learning mechanisms to perform security analytics. More specifically, the customizable security platform introduced here can perform user behavioral analytics (UBA), or more generally user/entity behavioral analytics (UEBA), to detect the security related anomalies and identify threats, regardless of whether such anomalies and threats are previously known or unknown.

The disclosed embodiments introduced here include a UI and customizable logic that allow users to readily influence the definition of rules based on a pattern of one or more anomalies. The underlying logic enables customization of the rules including attributes that define threat rules or anomaly action rules. The UI includes a number of windows and controls displayed in ordered steps to reduce the cognitive burden on users when creating, modifying, or deleting complex rules enabled by the customizable logic. Hence, threat identification and responses to anomaly detection can be tailored by users for their enterprises as a result of the easy-to-use UI.

The disclosed security techniques refine the concept of an anomaly pattern and expand upon it to include, for example, time ordering and numerous anomaly filters and associated attributes that can be customized for particular entities. For example, configurable rules may include one or more attributes that can be customized by operators, administrators, or any user that is able to do so. In some instances, some or all of the attributes of existing rules can be customized. Moreover, some or all of the rules can be disabled and enabled. For example, embodiments of the disclosed network security platform can be shipped to customers with the rules disabled by default, and then users can customize and/or enable individual rules after installation of the network security platform for operation on the customer's network. In some embodiments, the rules can be created at runtime for application on networks of individual customers.

Thus, users can customize the threats because the rules used to define the threats are configurable. In other words, users can liberally influence the definition of a threat for a particular network. The configurable rules can be set to identify new threat types, unknown to the data processing system, as opposed to the fixed palette of threat types available in exclusively preconfigured systems that change only with new releases of the entire network security platform.

In addition, new threat types may be added to the system long after the launch of the system. This can be done by creating new threat rules at a later point in time that look for additional anomaly patterns, which were never searched for before that point in time. The ability of the threat rules to process anomalies in any period of time in the past allows the late processing of all the anomalies for new types of threats, not know at the time of the anomaly generation.

In some embodiments, the execution of each configurable rule incrementally processes recently detected anomalies instead of every anomaly from the initial launch of the security platform. This allows for custom threat processing that is scalable to vast numbers of anomalies. Even batch processing of all the anomalies in the system from a beginning point in time is relatively fast because of the pattern detection algorithm employed by the threat rules.

Also introduced here are customizable actions (e.g., permanent deletion or temporary deletion by moving to trash memory, score adjustment, restore from trash, watchlist changes) for anomalies that affect threats and can cause the deletion or score update of existing threats. The customizable anomaly action rules can be executed to update existing threats incrementally, and based only on the anomalies that have changed, rather than updating based on all existing anomalies at the end of the day, regardless of anomalies that changed or remain the same. The anomaly action rules can always re-validate only the threats that are associated with the affected anomalies. Hence, it is always incremental in addition to being scalable.

That is, not only are the disclosed network security techniques scalable, but are also rapid enough to perform re-validation of threats in real-time, immediately after changes to anomalies have occurred and as often as changes occur during the day. In other words, the security techniques are flexible enough such that threats based on anomalies that change can be updated to reflect the change in real-time and updated at the same frequency as the anomalies change. As a result, the threats can always be refreshed to reflect the most recent changes throughout daily operations instead of waiting for the end of each day to fix any inconsistencies that were introduced throughout the day by acting on anomalies. When anomalies change, the scores of all the associated entities (e.g., user, device, application, domain) can also be dynamically re-validated in real-time because each entity known to the system can be scored based on anomalies with which the entity is associated and their score.

In some embodiments, the configurable rules are akin to content rather than threat creation logic that is hardcoded in the network security platform. Because the configurable rules are operable similar to content, they can be released and shipped independently of a network security platform's releases. For example, rules can be bundled into packages that are versioned. Anyone can create rules, including the developer of the network security platform or third parties.

The rules package can be bundled as a package sent to a customer, and installed to any UBA instance. A new version of the rules package can be released and used to transparently update the older versions of the rules package on any network security platform. As such, treating threat rules as content can make them autonomously deployable, and UBA has the tools (e.g., a rule packager) to make package installation transparent and reliable.

In some embodiments, the UI is a graphical user interface (GUI) that includes a series of windows and/or prompts to guide a user when defining threat rules or anomaly action rules. The GUI can also be used to manage custom threat rules or anomaly action rules. For example, the GUI can be used to edit existing customized threat rules for subsequent use on current and/or past activities of a network, or to determine current and/or past anomalies that constitute a threat. In some embodiments, a rule packager does not have a UI. Instead, for example, the interface may be a command line interface.

Thus, the disclosed embodiments can detect anomalies (e.g., patterns of anomalies), respond with custom actions, and identify custom threats produced by a user, a device, or an application, for example, regardless of whether the entity that causes the anomalies or threats is from outside or inside the organization's network. Additional security analytics techniques that can be adopted by the security tools include behavioral analytics that enable organizations of any size or skillset to detect and respond to unknown threats, which have been influenced by rules customized by users of the security platform.

The behavioral analytics can be based on, for example, machine learning, behavior modeling, peer group analysis, classification, statistical models, and graph analysis. These analyses can utilize, for example, Markovian processing flows, inference and grouping processes, and risk scoring mechanisms to develop user and entity profiles in order to compare and contrast activities, which ultimately allow the platform to detect and expose anomalies and threats. Also, as mentioned above, the network security platform can include a UI that enables users to influence the detection and exposure of anomalies and threats with custom rules. The resulting anomalies and threats or data derived therefrom can be rendered as visualizations on the UI. The security platform can be deployed at any of various locations in a private and/or public network to receive or monitor events that occur on local or remote computing devices.

The disclosed network security platform can process large volumes of data from multiple data sources that have different data formats and may provide data at very high data rates. In some embodiments, incoming data is processed using machine learning/data science techniques to extract knowledge from large volumes of data that are structured, semi-structured, or unstructured. For example, supervised and/or unsupervised machine learning can be employed to make it unnecessary to know in advance what anomalous activity constitutes a threat. In certain embodiments, incoming event data is evaluated in real-time and/or batch processing. For example, real-time processing continuously monitors and analyzes the incoming event data (e.g., in the form of an unbounded data stream) to uncover anomalies and threats.

When batch processing, historical data and third-party data are processed, optionally with the incoming real-time event data, to uncover, for example, more subtle anomalies and threats than the real-time processing path can uncover because of the real-time processing path's responsive time constraints. Batch processing may occur synchronously with real-time processing or in accordance with a predefined schedule.

FIGS. 2A and 2B collectively show a table that includes example anomalies that can be detected by machine learning models, as well as various event views and fields that can be used by the models to receive relevant information about the events for performing further analytics.

The detected anomalies or identified threats can automatically trigger a custom action, such as stopping the intrusion, shutting down network access, locking out users, preventing information theft or information transfer, shutting down software and or hardware processes, and the like. In certain embodiments, the discovered anomalies and identified threats may be presented to a network operator for further evaluation. As an alternative or in addition to automatically taking custom action based on the discovered anomalies and threats, the decisions by the user can be provided as feedback data in order to update and improve the models in a supervised learning configuration.

In the real-time data path, anomalies, threat indicators, and threats discovered by a batch analyzer may be actionable automatically or may be presented to a human operator for decision on whether to take action. The action taken by the operator to validate or invalidate conclusions reached by the batch analyzer may serve as a source of feedback to the security platform to improve its evaluation of subsequently processed data.

The anomalies, threat indicators, and threats, or data indicative of these items, may be provided to a UI review by a human operator. For example, a visualization and a threat alert may be presented to the human operator for review and possible action. The output of an analysis may also automatically trigger custom actions or preconfigured actions such as terminating access by a user, terminating a file transfer, or any other action that may neutralize threats. In certain embodiments, only notifications are provided to the UI system for review by the human operator. The event data that underlies the notifications or that gives rise to the detection can be persistently stored in a database. If the human operator decides to investigate a particular notification, the operator may access the event data (including raw event data and any associated information) that supports the anomalies or threat detection. On the other hand, if the threat detection is a false positive, the human operator may so indicate upon being presented with the anomaly or the threat, and modify or delete rules accordingly. The rejection of the analysis result may also be provided to the database. The operator feedback information (e.g., whether an alarm is accurate or false) may be employed to update the model to improve future evaluation.

3.1. Anomalies and Threats

The disclosed network security platform includes customizable rules that enable users to customize operations of the network security platform. The customizable rules can be part of a rules package in addition to existing preconfigured and/or non-configurable rules. Examples of the customizable rules include anomaly action rules and threat rules. The anomaly action rules can define "rule actions" (also referred to as "actions") that occur in response to certain detected anomalies. The custom threat rules can be used to identify security threats based on the detected anomalies. Thus, the threats can be identified based on one or more preconfigured, non-configurable, and/or configurable rules applied to the detected anomalies, which can trigger actions in accordance with anomaly action rules.

FIG. 19 is a block diagram illustrating a processing hierarchy 300 for detecting anomalies, identifying threat indicators, and identifying threats. Reducing false positives in identifying security threats to the network is one goal of the network security platform. In this regard, in step 302, the flow diagram depicts a large amount of incoming event data that is subjected to an anomaly detection process. The anomaly action rules are part of this processing stage through which all newly detected anomalies must pass before being registered and used to identify threats.

In step 304, the resulting anomaly data includes numerous anomalies from across a computer network. For example, a detected anomaly pattern is an unusual activity on a computer network that is often associated with one or more entities such as physical computing devices, virtual computing devices, users, software modules, accounts, identifiers, and/or addresses. An anomaly or a set of anomalies may be evaluated (e.g. scored) together, which evaluation may result in a determination of a threat.

In some embodiments, the anomaly data of step 304 is subjected to a threat indicator identification process. Threat indicators can be defined and detected as an additional type of indicator of a potential security breach. Threat indicators are an intermediary level of potential security breach indicator defined within a hierarchy of security breach indicators that includes anomalies at the bottom level, threat indicators as an intermediate level, and threats at the top level.

The anomaly data of 304 or threat indicator data of 306 can be subjected to a threat identification process including customized threat rules, in addition to any preconfigured or non-configurable threat rules, to identify threats. The threat rules represent an escalation of events of concern and are evaluated to identify if a threat to the security of the network exists. For example, hundreds of millions of packets of event data from various sources may be processed to yield 100 anomalies, which may be further processed in accordance with threat rules to identify threats.

3.2. Detecting Anomalies

Figure 4:
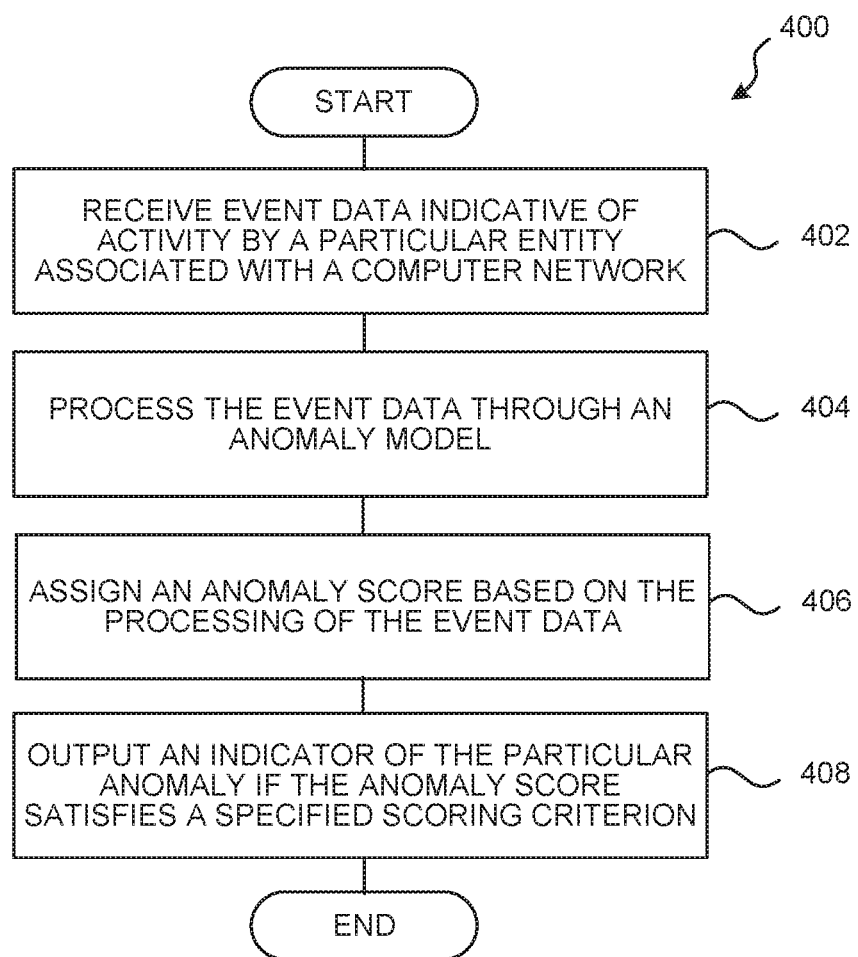
FIG. 4 is a flow diagram illustrating an example process for detecting anomalies.

FIG. 4 is a flow diagram describing an example process for detecting anomalies. Process 400 begins at step 402 with receiving event data indicative of activity by a particular entity associated with a computer network. In some embodiments, the event data is received by a security platform from a plurality of entities associated with the computer network via an Extract, Transform, Load (ETL) pipeline.

In step 404, the event data is processed through an anomaly model. In some embodiments, the anomaly model includes at least model processing logic defining a process for assigning an anomaly score to the event data and a model state defining a set of parameters for applying the model processing logic. In some examples, numerous anomaly model instances may be instantiated for each entity associated with the computer network. Each anomaly model instance may be of a particular model type configured to detect a particular category of anomalies based on incoming event data. For example, a computer on the computer network can be associated with various anomaly models, with one of the anomaly models configured to detect an anomaly indicative of a machine generated beacon communication to an entity outside the computer network.

In some embodiments, the security platform includes anomaly models configured to detect anomaly patterns such as a number of different kinds of anomalous activity including lateral movement, blacklisted entities, malware communications, rare events, beacon activity, and the like. Each of these anomaly models would include unique processing logic and parameters for applying the processing logic.

Similarly, each model instance (i.e. for a particular entity) may include unique processing logic and parameters for applying the processing logic. In some embodiments, processing of event data is performed in real-time as the event data is received. In such an embodiment, real-time processing may be performed by a processing engine optimized for high rate or real-time processing.

In step 406, an anomaly or anomaly pattern is assigned a score based on the processing of the event data through the anomaly model. Calculation of the anomaly score is done by the processing logic of the anomaly model and represents a quantification of a degree to which the processed event data is associated with anomalous activity on the network. In some embodiments, the anomaly score is a value in a specified range. For example, the resulting anomaly score may be a value between 0 and 10, with 0 being the least anomalous (e.g., substantially conforms to expected activity) and 10 being the most anomalous (e.g., usual activity).

In step 408, an indicator of a particular anomaly or anomalous pattern is output if the score satisfies a specified criterion (e.g., exceeds a threshold). Continuing with the given example, the specified criterion may be set such that an anomaly is detected if the anomaly score is 6 or above, for example. The specified criterion need not be static, however. In some embodiments, the criterion (e.g., threshold) is dynamic and changes based on situational factors. The situational factors may include volume of event data, presence or absence of pre-conditional events, user configurations, and volume of detected anomalies.

3.3. Anomaly Action Rules

A purpose of anomaly action rules is to define one or more actions that are to be applied on anomalies when specified criteria or conditions are satisfied. A characteristic of these rules is that, in the basic case, they can operate in real-time. The anomaly action rules are executed as part of the anomaly creation workflow, and their actions can be applied to anomalies that were just detected, provided that the characteristics of those anomalies were designated by filters of the anomaly action rules.

In some embodiments, an anomaly action rules engine has various functionalities that includes anomaly detection, dynamic score control, and dynamic watchlist updates (e.g., adding or removing anomalies from watchlists). These functions can have underlying advanced filtering available for customization with a UI, across diverse data and metadata (e.g., anomalies, users, devices, applications, domains) of a computer network. These functions provide a greater flexibility for users to control the outcome of results (e.g., security threat identification) by reducing false positives in a unique network environment, increasing or decreasing the scores for anomalies thereby controlling the score of the threat, using watchlists for easier investigation purposes, and the like.

A new anomaly action rule can be created in accordance with a series of defined steps, which can include one or more sub-steps. Each step or sub-step can include prompts for a user to input criteria that defines an anomaly action rule. A prompt may include fields or selectable options used to define the criteria. In some embodiments, a new anomaly action rule is defined through a series of steps including at least defining (i) the action to be taken on the anomalies selected by the rules criteria and (ii) an anomaly filter including a set of criteria for any attributes of the anomalies or entities (e.g., users, devices, applications, domains) associated with the anomalies.

After the user has input or selected a minimal amount of necessary information used to define an anomaly action rule, the anomaly action rule can be stored in a data store. The anomaly action rules can then be individually enabled, disabled, modified, or deleted. Each of the steps and sub-steps are part of the underlying logic that supports a UI, which reduces the complex process of creating or modifying anomaly action rules into a series of user friendly interactive steps.

A rule action is executed for each detected anomaly that matches the criteria specified by the anomaly action rule. Each of the steps or sub-steps described herein can be presented on one or more windows, controls, or prompts of a UI. The ability to customize anomaly action rules is enabled by the underlying logic of the network security platform as described above. For example, the underlying logic includes processes that facilitate creating new anomaly action rules or modifying existing anomaly action rules. In some embodiments, anomaly action rules can be created by using an existing anomaly as the template for its filter. In this case the anomaly action rule's filter is prepopulated with the values of the anomaly's attributes and the user can further customize the anomaly action rule. Thus, the processes reduce the customization of complex anomaly action rules into a series of defined steps and sub-steps that guide a user to create or modify the anomaly action rules.

In some embodiments, the underlying logic includes a three-step process to create a new anomaly action rule. An anomaly action rule can be created in accordance with the series of predefined steps and sub-steps that may be presented on a series of UI screen displays, as described further below. After inputting a minimal amount of criteria, an anomaly action rule can be stored in a data store. Hence, the disclosed embodiments facilitate the input of criteria to reduce the complex process of customizing anomaly action rules into a user friendly interactive process.

This disclosure is not limited to using three steps of underlying logic. Instead, some embodiments can include fewer steps, more steps, a different order of the steps, or combination of steps, could allow the user to skip steps, and/or could automatically populate certain fields with data. As such, the embodiments include any number of steps that are necessary and sufficient to define anomaly action rules.

Figure 5:
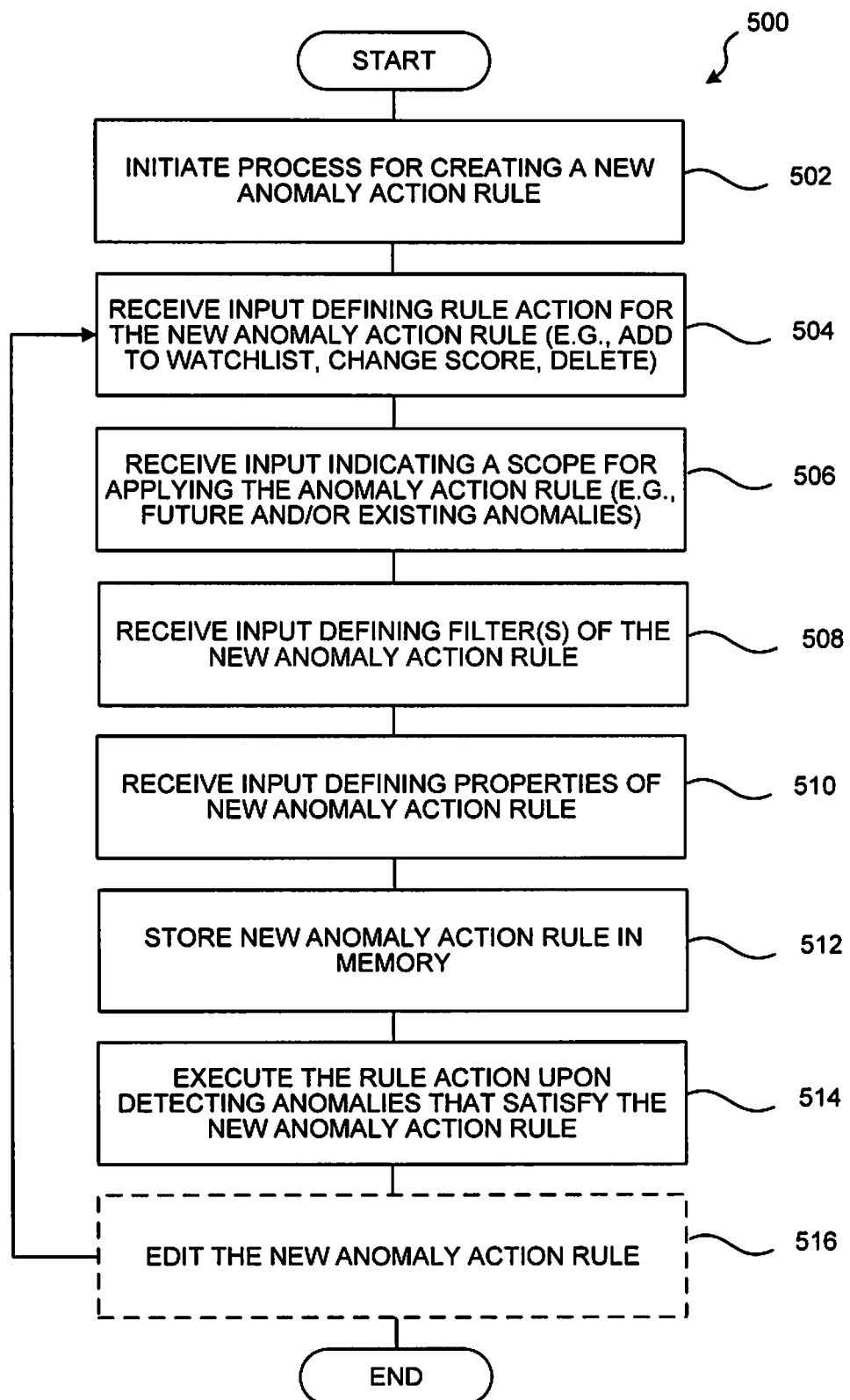
FIG. 5 is a flow diagram illustrating an example process for customizing anomaly action rules.

FIG. 5 is a flow diagram depicting an example process 500 for creating or editing (i.e., modifying) an anomaly action rule. In step 502, the process for creating a new anomaly action rule is initiated. For example, user input can indicate a desire to create the new anomaly action rule.

In step 504, input is received that defines a rule action for the new anomaly action rule. For example, a user can select one of three rule actions including adding or removing detected anomalies of a watchlist, re-scoring anomalies, or deleting anomalies. As explained further below, the network security platform monitors for anomalies using the anomaly action rules and, when a matching anomaly has been detected, performs the designated rule action of the anomaly action rule.

For example, if the rule action specifies adding the anomalies to a selected watchlist, then any matching anomalies are added to the watchlist. In some embodiments, various user-defined watchlists are selectable from a menu on the UI when configuring the new anomaly action rule. Note that in at least some embodiments a rule action to remove an anomaly from a watchlist cannot apply to newly detected anomalies that have not yet been added to any watchlists. Hence, the rule action of removing anomalies only applies when that rule action is executed on existing anomalies. In some instances, a number of anomaly action rules can be applied to existing or future anomalies, and the order for applying the anomaly action rules can be set by a user. As used herein, an "existing" anomaly may refer to an anomaly that has previously been detected and/or has been registered with the network security platform. As used herein, a "future" anomaly may refer to an anomaly that has not yet been detected by the network security platform and/or is not registered thereon.

If the rule action is set to re-score anomalies, the user can set an absolute score (e.g., integer value) or relative score (e.g., delta integer value) for matching anomalies. In either case, positive and negative values may be input. An absolute score will cause scores associated with matching anomalies to have the same score value as defined by the anomaly action rule. For example, the anomaly action rule can have a score ranging between 0 and 10, where 0 is the lowest value and 10 is the highest value. A relative score will cause scores associated with matching anomalies to change by adding or subtracting a designated value. Multiple anomaly action rules can operate on the same anomalies, effectively creating a pipeline of score adjustments. Hence, the order of execution of anomaly action rules can be critical to produce desired results. For example, a first anomaly action rule can set the score of all anomalies with certain characteristics to a specified score and a second anomaly action rule can additionally increase the score of all anomalies with the same characteristics for the users of a "Management HR Group" by another specified score.

If the rule action has been designated to delete anomalies, matching anomalies are either moved to a trash memory or permanently deleted, as designated by the anomaly action rule. If the rule action is to discard matching anomalies by moving them to trash, then the network security platform will mark matching anomalies as deleted but maintain them in a trash memory. The anomalies in the trash memory are not permanently deleted from the system and can be retrieved later. If the rule action is set to permanently delete matching anomalies, then the network security platform discards the matching anomalies permanently, which cannot be retrieved later because they are not stored in memory.

In step 506, a scope for applying the anomaly action rule is set. In particular, the anomaly action rule can be set to apply to future anomalies or future and existing anomalies. If the user selects to apply the anomaly action rule to future anomalies, then the anomaly action rule will be applied to all anomalies ongoing from the current point in time. If the user selects to apply the anomaly action rule to future and existing anomalies, then the anomaly action rule will be applied to those anomalies already detected in addition to any future anomalies.

In step 508, one or more filters of the anomaly action rule are set. The disclosed embodiments may include a library of predefined filters that are selectable by a user. In some embodiments, a filter can be defined using anomaly attributes including entity attributes. In some embodiments, there is a standard set of attributes common to all anomalies. However, each anomaly type can have one or more additional customizable attributes. The filters of anomaly action rules can utilize the custom anomaly fields along with standard ones.

Examples of predefined filters may include anomaly categories, anomaly type, anomaly watchlists, log format, and score. Normally an anomaly references multiple entities (e.g., users, devices, applications, domains). Accordingly, a filter may define attributes of entities associated with anomalies. For example, a filter can define an increase by 2 points of the score of all the anomalies that refer to a user in the company's management OU.

The library may include groups of filters detailing anomalies associated with entities such as user anomalies, apps anomalies, and domains anomalies. Examples for user anomalies include anomalies count, cities, countries, HR record, OUs, specific user, states, threats count, user status, and threats count. Examples for app anomalies may include anomalies count, app watchlists, specific apps, and threats count. Examples for domain anomalies may include anomalies count, domain watchlists, specific domains, and threat counts. A user can select any one of these predefined filters, and set additional criteria for the filter.

For example, a user may select an anomalies categories filter, and criteria for the filter including any of account takeover, allowed, beaconing, blacklists, blocked, denial of service, exfiltration, external alarms, and external attack. In some embodiments, the network security platform enables the user to search the library of anomalies by inputting matching keywords. Once a user has selected a filter from the filter library, and set criteria for that filter, the user can move to the next step for customizing the anomaly action rule.

In step 510, properties of the anomaly action rule are defined. For example, the anomaly action rule is named, and a user can input an optional description of the anomaly action rule. The name and optional description can be used later when identifying the anomaly action rule for subsequent editing or deletion. For example, the user can subsequently select the new anomaly action rule from the library of existing anomaly action rules and delete the selected anomaly action rule. In step 512, the new anomaly action rule is stored in memory such as a data store.

In step 514, the newly created anomaly action rule can be executed. The rule action of the anomaly action rule is executed upon detection of anomalies (e.g., a pattern of anomalies) that satisfy the criteria of the newly created anomaly action rule. In step 516, the newly created anomaly action rule is accessed for editing. In some embodiments, by selecting the anomaly action rule, the user can skip to any of steps 504 through 510, and make modifications to the criteria for those steps or sub-steps. The updated new anomaly action rule is then stored in memory for subsequent execution on matching anomalies.

3.4. Custom Threat Rules

Figure 6:
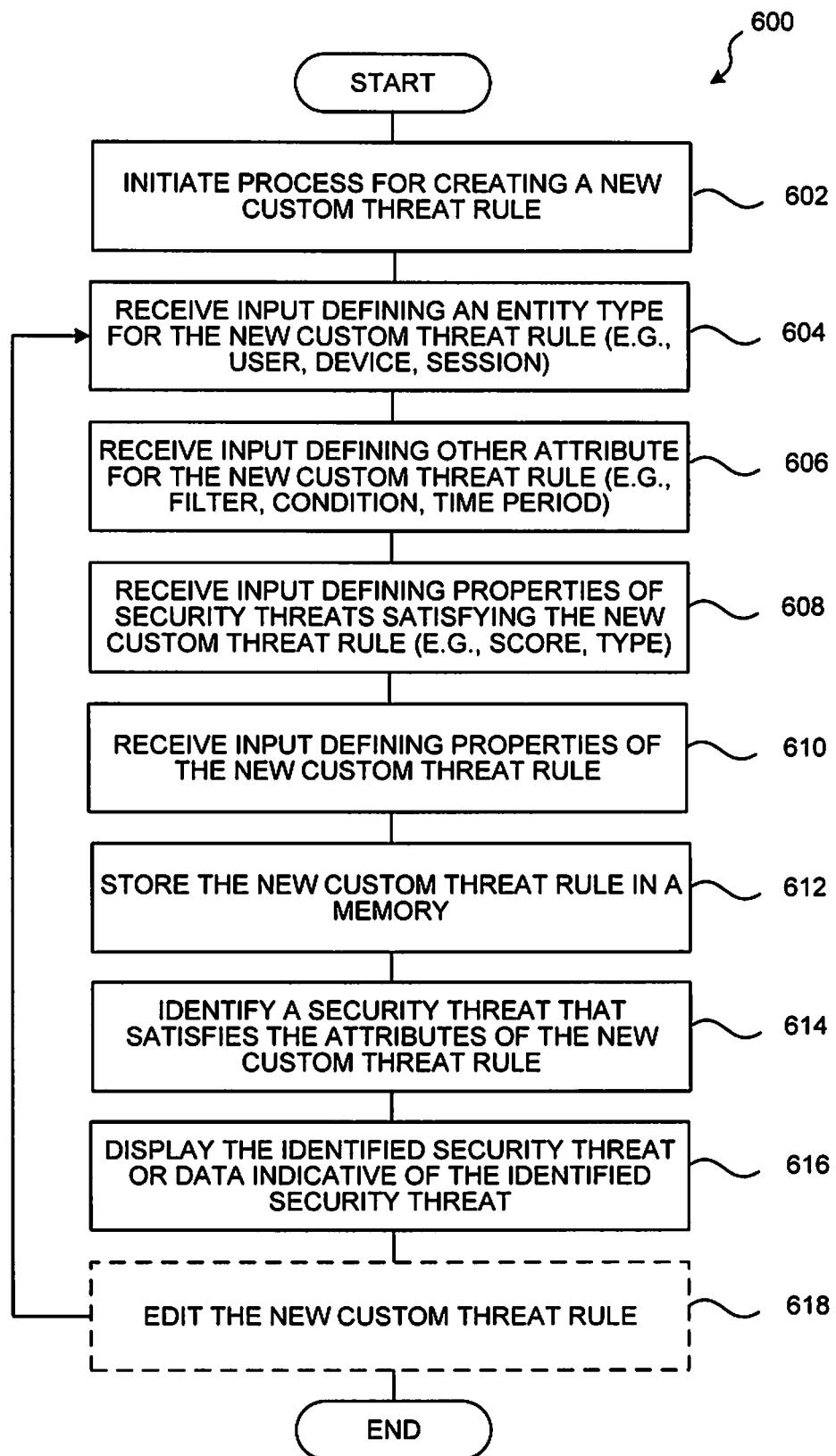
FIG. 6 is a flow diagram illustrating an example process for customizing threat rules.

FIG. 6 is a flow diagram depicting an example process 600 for creating or modifying a new custom threat rule. A new custom threat rule can be created in accordance with a series of ordered steps, which can include a series of sub-steps. Each step or sub-step can include prompts for user input including fields or one or more selectable options that define the custom threat rule. After the user has input or selected a minimal amount of necessary attributes used to define a custom threat rule, the custom threat rule can be stored in a rules data store. The custom threat rules can then be individually enabled, disabled, or deleted. Each of the steps and sub-steps described herein is part of the underlying logic that supports a UI, which reduces the complex process of creating or modifying threat rules into a series of user friendly, interactive steps. That is, the custom threat rule can be created in accordance with the series of steps and sub-steps, presenting them on one or more windows, controls, or prompts of a UI.

In step 602, the process for creating a new custom threat rule is initiated by, for example, user input indicating a desire to create the new custom threat rule. In step 604, creation of a new custom threat rule begins by receiving input defining an attribute such as an entity type. Examples of an entity include a user, device, session, or domain. The custom threat rule's entity type defines what entities the custom threat rule will process.

The custom threat rule can scan anomalies looking for anomaly patterns that satisfy the custom threat rule. The scanning is not necessarily random; instead, it occurs per known system entity of the custom threat rule's entity type. For example, a custom threat rule with a user entity type will process the selected anomalies (by its filter) per user and will search for patterns in each user's anomalies and not across all the selectable anomalies. Hence, in some embodiments, an entity type is the cornerstone to how custom threat rules operate.

In step 606, the user inputs additional attributes that define the new custom threat rule including at least one of an entity filter, a condition, or a time period. An entity filter is optional and defines criteria for the type of entity such that any entities matching the entity filter criteria satisfy the entity filter of the new custom threat rule. As such, only the entities of the specified entity type that match the criteria are processed. For example, a custom threat rule may process the anomalies of all users looking for anomaly patterns per user. Another custom threat rule may process only the anomalies of the users in a specific country for a second anomaly pattern.

For example, if a user entity is selected in step 604, the filter options may include anomalies count, city, country, HR record, OU, specific users, state, threat counts, user status, user watchlists, or the like. A user can select one or more of the filters and define one or more criteria or constrains associated with the selected filter. For example, if the user selects an anomalies count, the user can constrain the anomalies count to be bounded by a user-defined number.

Conditions are used to defined one or more anomaly patterns. An anomaly pattern is defined as a group or set of anomalies. The anomalies in each set are selected by an anomaly filter, which may include any combination of anomaly or entity attributes. Thus, in some embodiments, there can be only one distinct anomaly filter per anomaly set. In some embodiments, a minimum anomaly count is defined per set. The pattern's group may contain any number of anomaly sets.

In some embodiments, a condition defines an anomaly such that any entities of the type of entity associated with the anomaly satisfy the condition of the custom threat rule. In some embodiments, a user can select an anomaly type such as those shown in the table of FIGS. 2A and 2B. The user defines an anomaly count for the anomaly type and associates one or more filters with the anomaly type. The anomaly filters can select anomalies in a manner similar to that described above with respect to anomaly action rules. That is, an anomaly filter can contain attributes of the anomalies themselves or of the entities typically referenced by anomalies. For example, a custom threat rule with user entity type may process all anomalies of types X and Y associated with at least one device of type 'Firewall' (or with external scope) per user. Examples of an anomaly filter may include a category, watchlist, log forum, or score. Examples of criteria associated with devices include anomalies count, resolutions, scopes, types, watchlists, specific devices, or threat counts. Examples of criteria associated with applications include anomalies count, watchlists, specific apps, or threat counts.

For example, if a user selects an anomaly categories filter, the user can then select to include one or more categories including account takeover, allowed, beaconing, blacklists, blocked, denial of service, exfiltration, external alarms, external attack, incoming, and the like. In another example, if the user selects a score filter, the user is then prompted to designate an anomaly score value or range between 0 and 10, with 0 being the least anomalous and 10 being the most anomalous. In another example, if the user selects an apps filter, the user is prompted to select from one or more applications. The user can repeat step 606 any number of times for several anomaly types used to define the custom threat rule.

In some embodiments, the processing of anomalies of a custom threat rule is done per entity of the custom threat rule's entity type. A pattern is detected when in the given time interval there is at least the minimum number of anomalies per set for all sets of the pattern's group. If the pattern is ordered, then the anomalies of each next set have to chronologically occur after at least the minimum number of anomalies of the previous set in the pattern's group.

For example, an instance of the ordered pattern with the sets 2 anomalies of type X and 5 anomalies of category Y in 6 hours could be the following: X, X, X, Y, X, Y, Y, Y, Y, X, Y provided that all the previous 11 anomalies occurred within 6 hours. These 11 anomalies will become part of the custom threat to be raised by the rule for this occurrence of the pattern.

In some embodiments, a user can optionally specify time related conditions for the anomaly patterns. Examples include an anomalies interval, maximum threat duration, and threats gap attributes of the anomaly patterns. The anomalies interval sets the minimum anomalies of every set of a pattern that have to occur at most within this interval. If the anomalies are detected but the interval between the first and the last is greater than the set interval, then the pattern is not matched.

For maximum threat duration and threats gap conditions, for example, custom threat rules are executed on a daily basis and in every execution they process the anomalies generated between the time of the execution (t1) and t1-anomalies_interval. If the period t1-anomalies_interval is less than 24 hours, then the processed period becomes [t1, t1-24 hours].

If in yesterday's execution the custom threat rule's pattern was detected and threat T1 was raised, then if in today's execution the same pattern maybe detected, the custom threat rule can either raise a new threat T2 or merge the anomalies of the new occurrence of the pattern to threat T1. This decision is based on the maximum threat duration and threat gap conditions.

For the maximum threat duration, if the new anomalies found today were added to T1 without violating the maximum threat duration constraint (i.e., without making T1 last longer that this duration), then they will be added to T1 and T2 will not be generated. The duration of a threat can be defined as the time period between its earliest and its latest anomalies. For the threats gap, if in today's run more anomalies are found that that satisfy one of the pattern's filter, then the process keeps adding them to the last found threat T1 as long as the chronological gap between every such anomaly and the previous one is smaller than the threats gap.

A time period condition defines a scope for processing anomalies such that any entities of the type of entity associated with anomalies occurring within the time period satisfy the time period of the custom threat rule. Examples of the anomaly processing include processing anomalies from the present day forward and/or processing at least some anomalies from the past. If the user selects processing of anomalies from the past, then the user may be prompted to either a window defining a time range from the instant day back in time. Alternatively, the user can select for processing any anomalies beginning from a specified date to the present date.

For example, a custom threat rules package can work for future anomalies (e.g., anomalies that represent events with future dates). Hence, the threats rule package could be installed today and the evaluation window for one of the threat rules can be set to begin 5 days from today. If the threat rule gets executed on May 26, 2016 at 2 AM, it will look for events that occurred between May 21, 2016 and May 26, 2016 (2 AM). The rule can continue running for all days in the future (e.g., it will consider the present day minus 5 days on every execution). If the user wants to see if the threat rule triggers on any past anomalies, the user can edit the rule via the UI.

In some embodiments, custom threat rules go back at least 24 hours as described above with respect to the maximum threat duration and threats gap conditions from the beginning of the day of the execution and not from the execution time. As such, if the execution time is 2 AM on May 26, 2016 and the anomalies interval (i.e., evaluation window) is 5 days, then the processed period will be May 21, 2016 00:00-May 26, 2016 00:00.

In step 608, the user can input one or more properties of the threats generated in accordance with the custom threat rule. For example, the threats can be assigned a score ranging between 0 and 10, with 0 being the least threatening and 10 being the most threatening. In some embodiments, the user can also specify use of an existing custom threat type such as malware, compromised account, user at high risk, data exfiltration after account takeover, internal server at high risk, compromised web server, exfiltration, possible phishing attack, or the like. Alternatively, the user can create a custom new threat type that includes a custom description and can include threat recommendations instructive of how to handle the threat.

In step 610, the user can input properties that define the new custom threat rule. For example, the user can name the new custom threat rule, and optionally provide a description. The name and description can be used later when identifying the threat rule for subsequent editing or deletion. For example, the user can subsequently select the new custom threat rule from a library of existing rules and edit or delete the selected custom threat rule. In step 612, the new anomaly action rule is stored in memory such as a data store.

In step 614, the newly created custom threat rule can be executed. A security threat that satisfies the attributes of the newly created custom threat rule constitutes a threat to the computer network. In step 616, any identified security threat or data indicative of the identified security threat can be displayed on a display device. In step 618, the newly created custom threat rule is accessed for editing. In some embodiments, by selecting the custom threat rule, the user can skip to any of steps 604 through 610, and make modifications to the attributes for those steps or sub-steps. The updated custom threat rule is then stored in memory for subsequent execution on matching anomalies.

3.5. Identifying Threats

In operation, the one or more preconfigured, non-configurable, and/or configurable (e.g., custom) threat rules are applied to event data to identify threats based on detected anomalies as described above. In some embodiments, the threat rules are applied to identify threat indicators by processing anomaly data through a threat indicator model, which, like the anomaly models, may also be a machine learning model. Similar to the anomaly models, a threat indicator model includes model processing logic defining a process for assigning a threat indicator score based on processing the anomaly data and a model state defining a set of parameters for applying the model processing logic.

In some embodiments, processing of the anomaly data may include aggregating anomaly data across the computer network, correlating different anomalies within the anomaly data, and/or enriching anomaly data by using external data sources. In some embodiments, the anomaly data is processed in real-time or near real-time as the event data is received and anomalies are generated, with a processing engine optimized for high rate or real-time processing. In some embodiments, the anomaly data is processed in batch mode by a processing engine optimized for high volumes of data. The threat indicators can be assigned scores based on, for example, the processing logic of the threat indicator model. A score represent a quantification of a degree to which the processed anomaly data is associated with activity that may be a threat to the security of the network.

Figure 7:
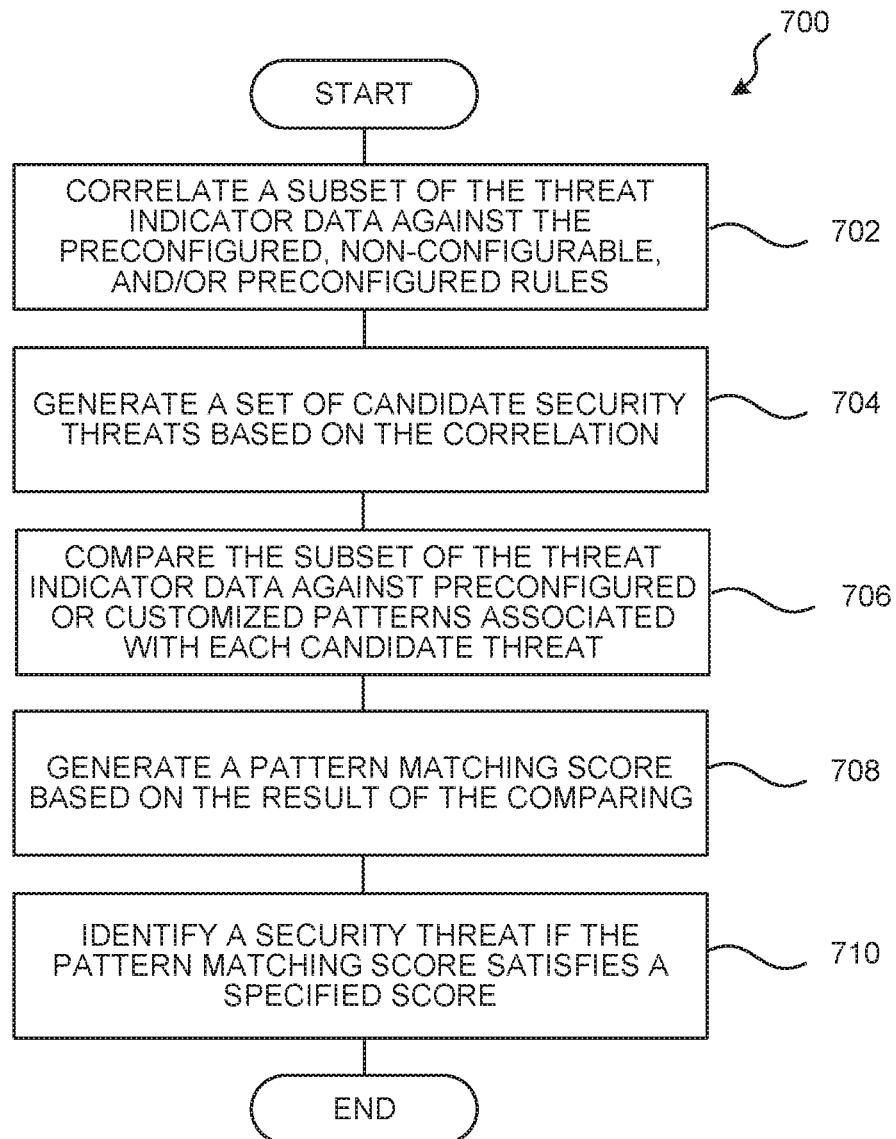
FIG. 7 is a flow diagram illustrating an example process for identifying security threats to a computer network.

FIG. 7 is a flow diagram depicting an example process 700 for identifying a threat to the security of a computer network based on threat indicators. The process of identifying a threat based on a correlation of anomalies is described elsewhere in this disclosure. The same concept applies here, except that the threat is identified based on correlating identified threat indicators instead of the anomaly data.

In step 702, the threat indicator data, or at least a subset of the threat indicator data, is correlated. In step 704, a set of candidate security threats is identified based on the correlation. Types of correlation can include network-wide correlation for malware threats, connected component correlation for kill chain type threats, per-entity analysis for kill chain type threats, and per-burst analysis for insider threats.

In step 706, the threat indicator data is compared against the preconfigured, non-configurable, and/or configurable rules associated with each candidate threat. For example, an insider threat may be associated with patterns identified by the user or security experts. In step 708, a pattern matching score is generated based on a result of the comparing. In some embodiments, the pattern matching score is a value in a set range. For example, the resulting pattern matching score may be a value between 0 and 10, with 0 being the least likely to be a threat and 10 being the most likely to be a threat.

In step 710, a security threat is identified if the pattern matching score satisfies a specified criterion of the threat rules, which may be customized as described above such that a threat is identified if the pattern matching score is, for example, 6 or above. The specified criterion need not be static, however. In some embodiments, the criterion is dynamic and changes based on situational factors. Situational factors may include volume of event data, presence or absence of pre-conditional events, user configurations, volume of detected anomalies, and involvement of mission critical systems.

4.0. User Interface for Network Security

Figure 8:
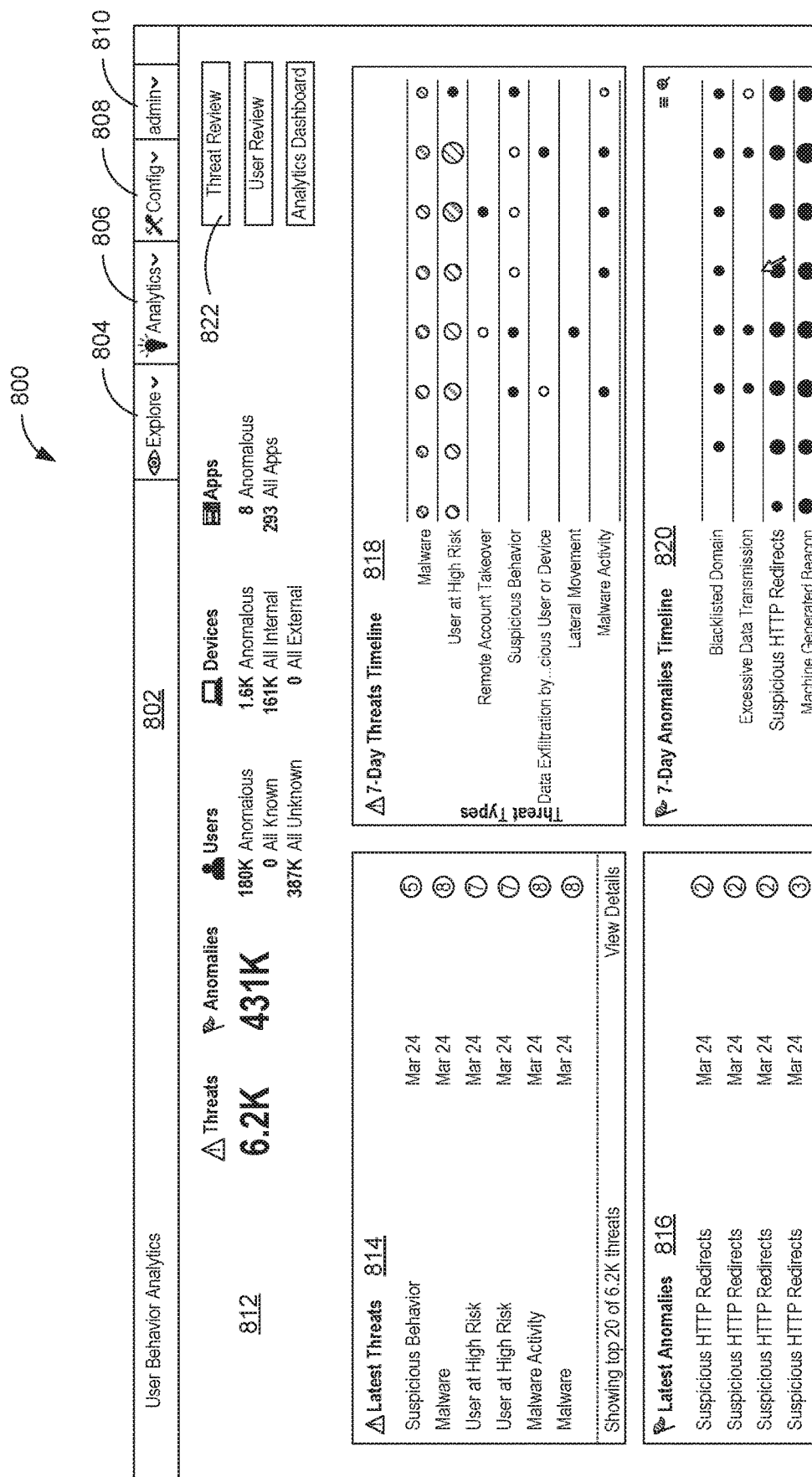
FIG. 8 is an illustrative view of a home screen user interface screen display.

FIG. 8 is an illustrative view of a home screen 800 generated by display data for display in a UI. As used herein, an example of a UI for a network security platform is a graphical user interface (GUI). This may be the first screen view after log-in by the user. Toolbar 802 also may be included in all views generated for display in the UI. In this example, the toolbar includes an "Explore" tab 804 (e.g., Views tab), "Analytics" tab 806, "Config" tab 806, and "Admin" tab 808 (e.g., UI user name tab) for log-in.

By clicking on the Explore tab 804, the UI user can toggle the UI between a "Threats" view, "Anomalies" view, "Users" view, "Devices" view, and/or "Applications" view. The Threats view provides a listing of all active threats and the Anomalies view provides a listing of all anomalies. The Users view, Devices view, and Applications view provide separate listings for each type of entity (namely, users, devices, and applications, respectively) that is associated with an anomaly or threat.

The home screen 800 may also include a summary status bar 812 indicating, for example, the number of threats, anomalies, total users, total devices, and total apps on the network being monitored. The summary status bar 812 can enable the UI user to see, at a glance, a volume of information that can be reviewed and evaluated.

The home screen 800 can additionally include summary charts and illustrations, such as, "Latest Threats" 814, "Latest Anomalies" 816, a "7-Day Threats Timeline" 818, and a "7-Day Anomalies Timeline" 820. Each of 814 through 820 present a comparison of different threats or anomalies that are most recent or within the previous 7-Day period. The listing in the Latest Threats 814 identifies the most recent threats by date. The listing in the Latest Anomalies 816 identifies the most recent anomalies by date.

The 7-Day Threats Timeline graphic 818 is a timeline showing the volume of different threats along a timeline. In particular, the Threats Timeline 818 shows a timeline of each threat, sorted by threat type. In this example, there are seven threat types: "Malware," "User at High Risk," "Remote Account Takeover," "Suspicious Behavior," "Data Exfiltration by Suspicious User or Device," "Lateral Movement," and "Malware Activity." The timeline shows a circle corresponding to each occurrence, which is color-coded to indicate its severity. If there is more than one threat of the same type on the same date, the circle is made larger. By hovering over a circle, a bubble is generated that provides the date of the threat or threats and prompts the user to select more detailed information (not shown). Upon clicking on a bubble, the UI generates an associated "Threat Table" view 1200, in the format shown in FIG. 12.

The 7-Day Anomalies Timeline 820 is a timeline showing the volume of different anomalies along a timeline. In particular, the Anomalies Timeline 820 shows a timeline of each anomaly, sorted by anomaly type. In this example, there are four anomaly types: "Blacklisted Domain," "Excessive Data Transmission," "Suspicious HTTP Redirects," and "Machine Generated Beacon." The timeline shows a circle corresponding to each occurrence, which is color-coded to indicate its severity. If there is more than one anomaly of the same type on the same date, the circle is made larger. By hovering over a circle, a bubble is generated that provides the date of the anomaly or anomalies and prompts the user to select more detailed information (not shown). Upon clicking on a bubble, the UI generates an associated "Anomalies Table" view 1000, in the format shown in FIG. 10.

Figure 9:
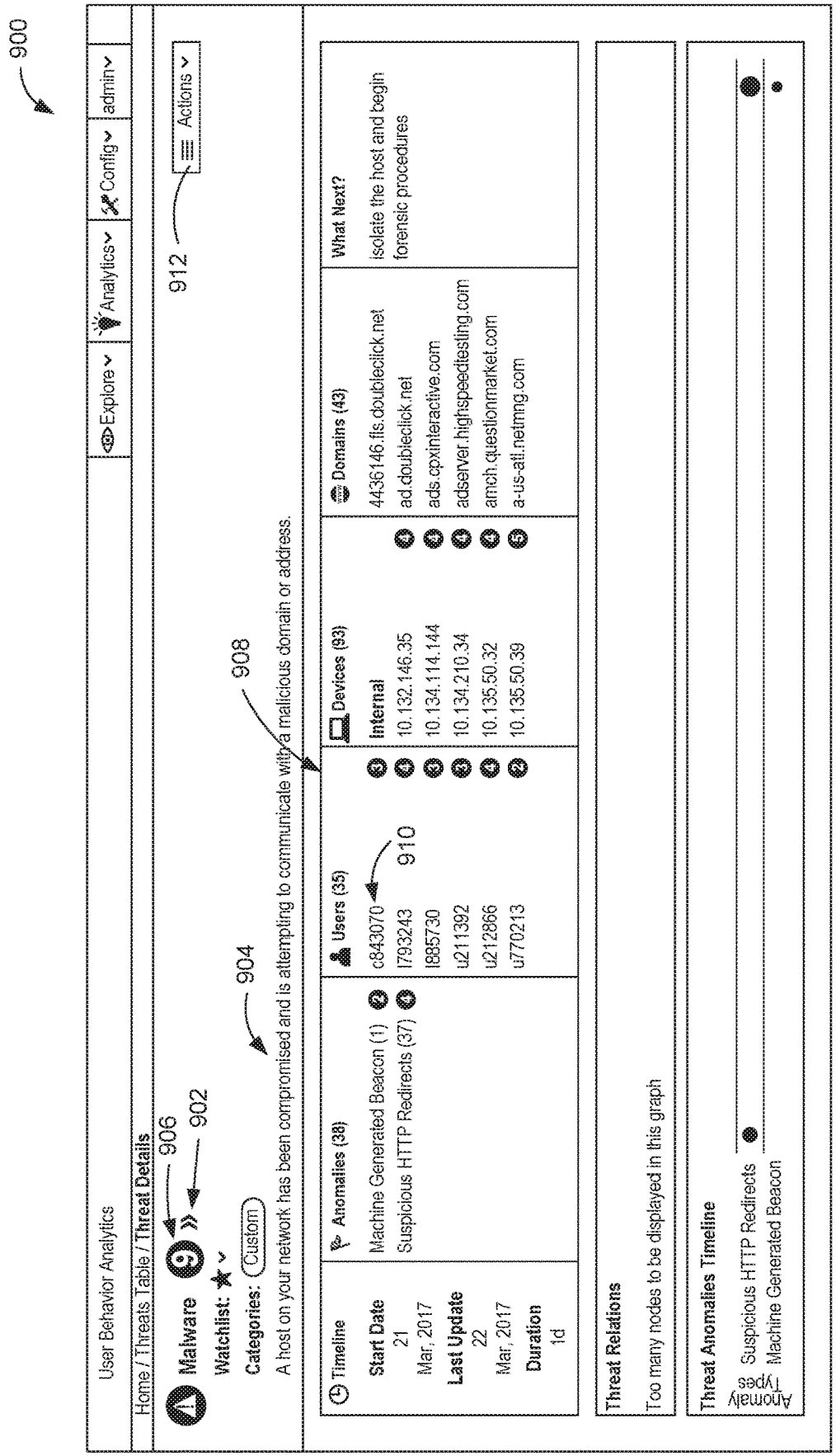
FIG. 9 is an illustrative view of a "Threats Review" user interface screen display.

The example home screen view 800 also prompts a user, via status bar 802, to begin a "Threat Review," "User Review," or view an "Analytics Dashboard." Upon clicking, via the UI, on the Threat Review button 822, a "Threats Details" view 900 is presented, as described with reference to FIG. 9. As shown in FIG. 9, an example "Threats Details" view 900 enables a user to separately click through each active threat that has been identified from the event data. In the upper-left side of the view, a toggle 902 control enables the user to step through each identified threat. Each Threat Details view 900 can identify a particular threat by its type and provides a summary description 904 along with a threat score 906. The threat score is determined based on, for example, machine learning from the event data, and provides an indication of the severity of the risk for network compromise associated with the threat.

The Threats Details view 900 can additionally include a status chart 908 that provides a Timeline, list of Anomalies, list of Users, list of Devices, list of Apps, and a suggestion of "What Next?". The Timeline identifies the date that the threat began, the last update concerning the threat, and the duration of time that the threat has been active. The list of Anomalies identifies each type of anomaly that is associated with the threat and how many anomalies of each type. The list of Anomalies also provides a score for each type of anomaly, which indicates the severity associated with each type of anomaly. The list of Users identifies each user associated with the threat and provides a score for each user. Similarly, the list of Devices and list of Apps identify each device (by IP address) and App (by file name/type), respectively, along with a score. For each entity (e.g., user, device, and app), a link is included such that, if the link is clicked, the user is taken to a separate view for that selected entity. For example, if the link associated with "c827070" 910 is clicked, a "Users Facts" page within the Threat Details is generated.

The Threat Details view 900 additionally prompts the user to take "Actions" 912. By clicking on the Actions control 912, the user can select from several options (not shown). If the user determines that the threat is not a concern, the user can select "Not a Threat." By making this selection, the user instructs the network security system to delete the threat page from the Threats Details view and to no longer identify it as a threat. As a consequence, the total number of threats will decrease (as will be depicted in the status bar 812 in FIG. 8). Another option in the Actions tab 912 is the "Email Threat" selection, which enables the user to email the threat to a designated email address. Yet another option is the "Export" selection, which enables the user to export data associated with the threat to another data mining platform.

Figure 10:
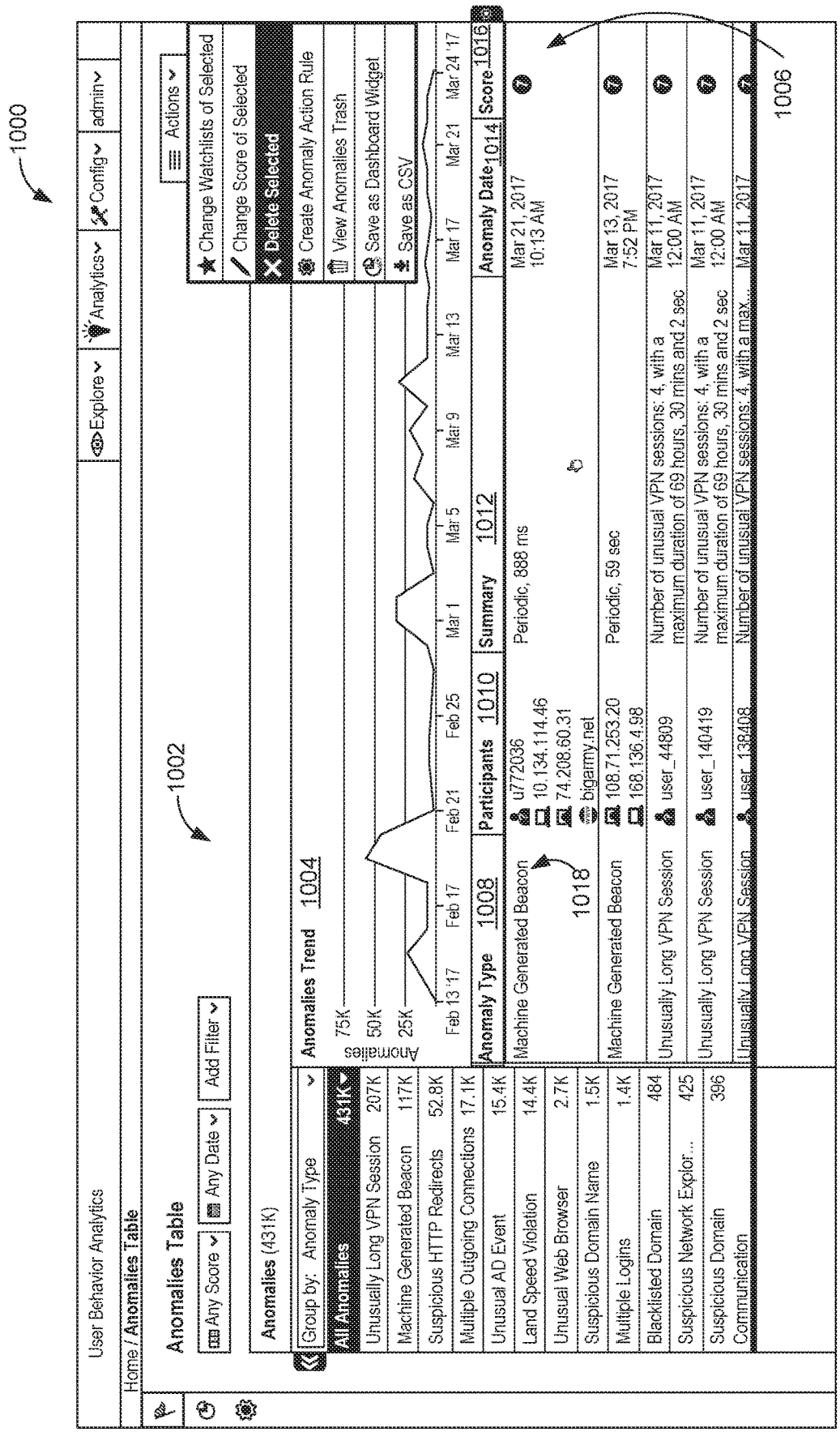
FIG. 10 is an illustrative view of an "Anomalies Table" user interface screen display.

As shown in FIG. 10, clicking on this link causes the UI to generate an "Anomalies Table" 1000 view that lists and provides high-level information about anomalies. The Anomalies Table 1000 includes a "Group by Anomaly Type" control 1002 that allows a user to select anomalies, to present detailed analytics of the selected anomalies. For example, the Anomalies Table 1000 presents an "Anomalies Trend" timeline graphic 1004 of the selected anomaly. This includes a line graph indicating a number of anomalies during periods of time. With this illustration, a UI user can quickly discern whether a large number of anomalies occurred on a particular date or time period, and whether there is a trend of increasing or decreasing anomalies. By hovering over a point on the line, the UI may generate a bubble indicating the date and number of anomalies on that date.

Figure 11:
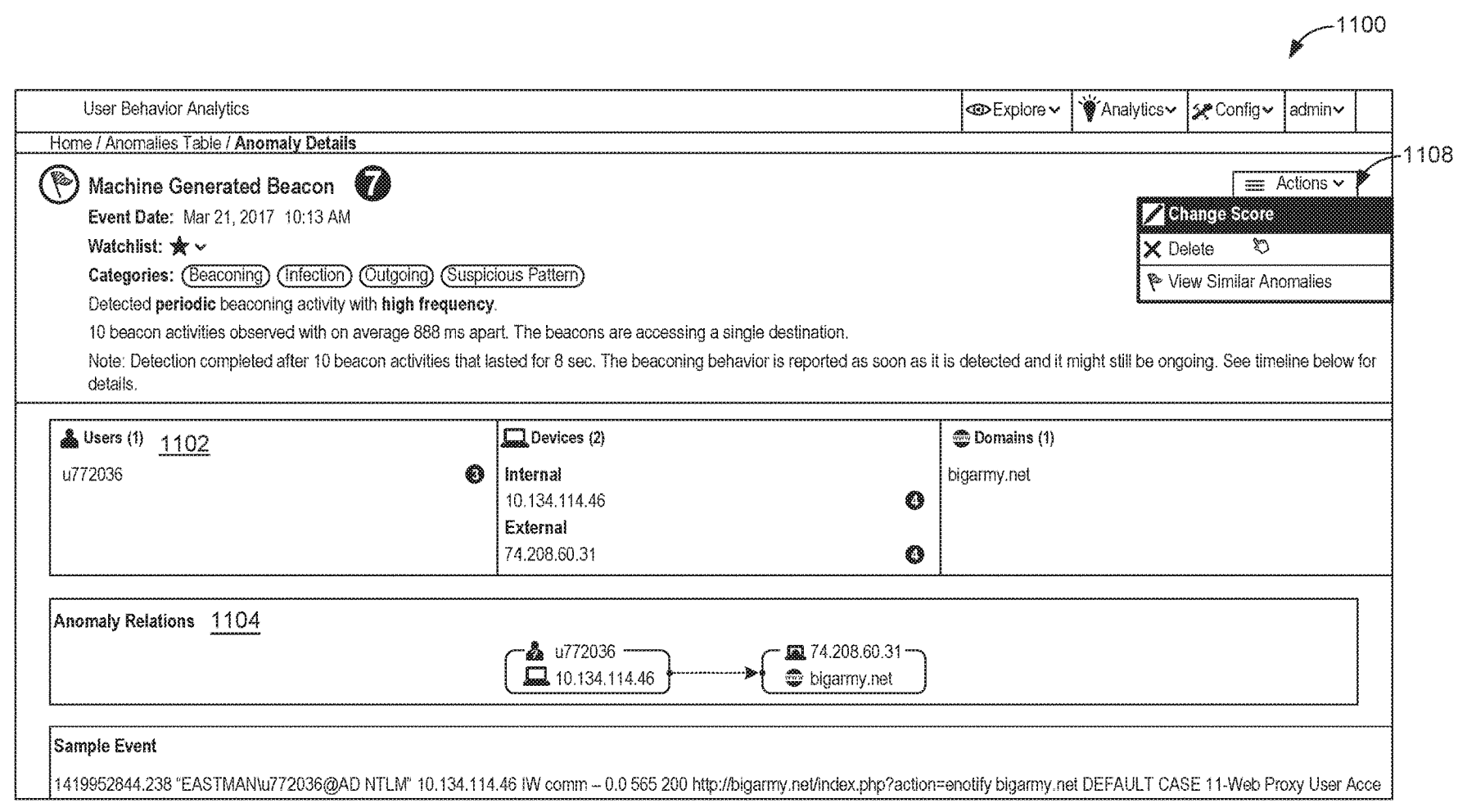

The Anomalies Table 1000 also includes a detailed Anomalies listing 1006. In the listing, each entry is associated with an "Anomaly Type" 1008, one or more "Participants" 1010, a "Summary" 1012, an "Anomaly Date" 1014, and a "Score" 1016. For example, "Machine Generate Beacon" 1018, the first listed anomaly type, is associated with a single "Participants," user "u772036," two devices "10.134.114.46" and "74.208.60.31," and a session "bigarmy.net." The "Summary" of the anomaly is "Periodic, 888md," and the Anomaly Date 1014 indicates that the anomaly occurred on "Mar. 21, 2017 10:13 AM." Lastly, the score associated with the anomaly is "7." By clicking on "Machine Generate Beacon" 1018, the UI navigates to "Anomaly Details" 1100 view as shown in FIG. 11.

For the anomaly corresponding to the Anomaly Details 1100 ("Machine Generated Beacon"), a single user is the only entity that is associated with the anomaly ("u772036"). The Anomaly Details 1100 includes a box identifying the "Users" 1102 (e.g., "u772036") along with the user's associated score (not shown). "Users" can include all personnel in the organization who caused the anomaly, were victims, or otherwise participated in some network activity that triggered the identification of the anomaly. In this example, the Anomaly Details 1100 additionally includes an "Anomaly Relations" box 1104. This box illustrates the connection, or "relationship" between different entities (users, devices, applications, domain) that participated in the anomaly. In the example, a relationship exists between the user's internal device "10.134.114.46" and a URL "big-army.net" of an external device "74.208.60.31." The Anomaly Details 1100 additionally includes a "Actions" 1108 control. This control allows the UI user to edit the anomaly by selecting "Change Score," delete the anomaly by selecting "Delete," or view similar anomalies by selecting "View Similar Anomalies."

Figure 12:
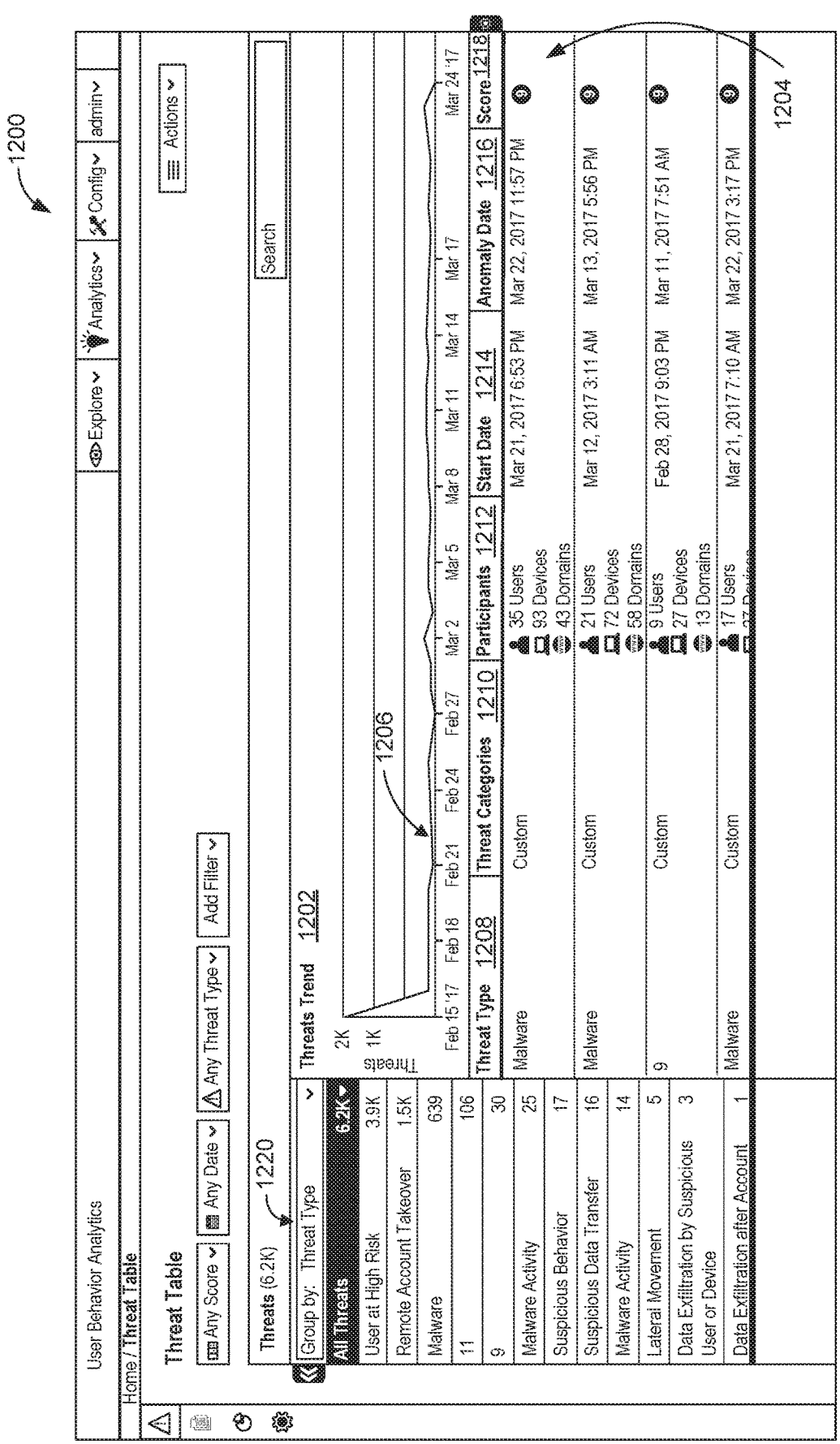
FIG. 12 is an illustrative view of a "Threats Table" user interface screen display.

FIG. 12 is an illustrative view of a "Threats Table" screen 1200 according to some embodiments of the present disclosure. FIG. 12 provides an example view that the UI generates when a UI user selects the Threats Review 1222 in FIG. 12. The Threats Table 1200 provides a Threats Trend timeline 1202 and a Threats listing 1204. The Threats Trend 1202 illustrates the number of threats over a period of time. In some embodiments, this can be provided as a line chart that includes the same information re-formatted as a column chart (not shown), or a breakdown column chart (not shown).

While viewing the Threats Trend 1202, the UI user can use the cursor to hover over displayed data to receive more specific information. For example, hovering over the data on the line at 1206 can cause a text bubble to appear (not shown), indicating a specific date (or time) and the number of threats at that point.

The Threats listing 1204 lists all active threats. The Threats listing provides, for each entry, the "Threat Type" 1208, "Threat Categories" 1210, "Participants" 1212, "Start Date" 1214, "Last Update" 1216, and "Score" 1218. A summary section 1220 identifies the number of threats of each type and provides an option to just display the threats of a certain specified type.

To receive specific information about a threat in the subset of threats, the UI user can click on a link in the Threats listing 1204. The UI then navigates to the Threat Details page 900 as shown in FIG. 9. This page provides the same information (including the same charts, graphs, etc.) provided via the Threats Review 900 view.

While viewing the Threats Table 1200, the UI user can navigate to the Anomaly Details 1100 in FIG. 11. For example, from within the Threats listing 1204 in FIG. 12, a UI user can click on the link for any threat category to receive additional details (not shown). In some embodiments, the "Threats Table" 1200 includes a selector that, upon selection, generates the display of a geographical representation of the identified threats (not shown).

4.1. User Interface for Custom Threat Rules

FIG. 13 is an illustrative view of a "Custom Threats" home screen. The Custom Threats home screen 1300 includes a "Threat Rules" list 1302 of custom threat rules. Each entry of the Threat Rules list 1302 includes a "Name" 1304, "Threat Type" 1306, "Threats" 1308, "Added By" 1310, "Date Added" 1312, "Enabled" 1314, and shortcut icons 1316 to modify the custom threat rule. Lastly, the Custom Threats home screen 1300 includes a "New Threat Rule" control 1318 that, upon its selection, opens one of a series of screens to guide the UI user through a process to create a new custom threat rule as described below.

For example, for the first threat rule entry, the Name 1304 is "Potential Flight Risk Exfiltration." Below the name is a description of the threat rule: "Looks for Flight Risk users who may be exfiltrating sensitive data." The Threat Type 1306 is "Exfiltration." The number of Threats 1308 is 0, which reflects that no such threats have been identified. The Added By 1310 indicates that the "admin" user added the threat rule, and the Date Added 1312 indicates that the threat rule was added on Mar. 4, 2017. The Enabled control 1314 is a control that allows the UI user to enable or disable the threat rule by toggling the control. In this example, each and every custom threat rule is enabled. However, the UI user can move each Enable 1314 individually to disable a respective custom threat rule.

Lastly, the shortcut icons 1316 can be selected by the UI user to modify the custom threat rule in one of three ways. Selecting the graphic icon that resembles a pencil allows the UI user to edit the custom threat rule. Selecting the overlapping graphic icons allows the UI user to edit or add comments for the threat rule. Lastly, selecting the graphic-x shortcut removes the custom threat rule from the custom Threat Rules list 1302.

4.1.1. User Interface for Creating Custom Threat Rules

The ability to customize threat rules is enabled by the underlying logic of the security platform as described above. For example, the underlying logic includes processes that facilitate creating new custom threat rules or editing existing custom threat rules. The processes reduce the customization of complex threat rules into a series of defined steps and sub-steps that guide a user to create custom threat rules.

To further reduce the cognitive burden on users to customize threat rules, the disclosed embodiments include a series of screens of a UI presented in an easy-to-use format. FIGS. 14 through 20 illustrate an example of a series of screens for creating new custom threat rules. In particular, these figures illustrate screens enabled by the underlying logic described with respect to FIG. 6.

In the illustrated embodiment, the underlying logic can include a six-step process to create new custom threat rules. Each step has a corresponding one of a series of six display screens illustrated in FIGS. 14 through 20, respectively. A custom threat rule is created in accordance with the series of predefined steps and sub-steps that are presented on respective UI screens of FIGS. 14 through 20. Each screen has controls or fields for the UI user to input attributes defining the custom threat rule. After inputting a minimal amount of necessary attributes, a custom threat rule can be stored in a data store. Hence, the UI facilitates the input of attributes to reduce the complex process of customizing threat rules into easy-to-use interactive screens.

Although the illustrated embodiment includes six display screens, this disclosure is not so limited. Rather, some embodiments may include fewer steps, more steps, a different order or combination of steps, could allow the UI user to skip steps, and/or could automatically populate certain steps with data. As such, the disclosed embodiments include any number of steps and corresponding screens that are necessary and sufficient to define custom threat rules.

Figures 14, 15:
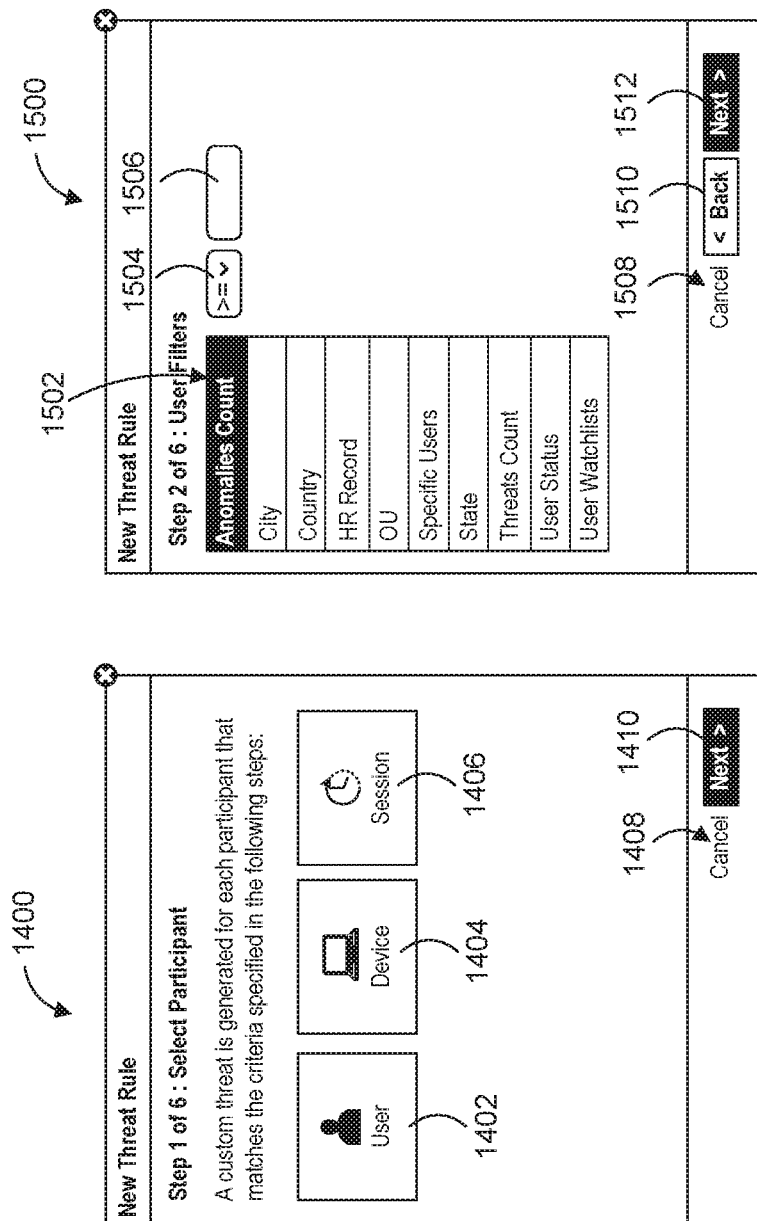
FIG. 14 is an illustrative view of a first user interface screen display to define an entity for a custom threat rule.
FIG. 15 is an illustrative view of a second user interface screen display to define filters for a custom threat rule.

Creating a custom threat rule begins by selecting an entity subject to the new custom threat rule. Examples of entities include a user, device, or session. FIG. 14 is an illustrative view of a first screen 1400 for a UI user to select an entity for a new custom threat rule. The first screen 1400 can be displayed in response to selection of the New Threat Rule control 1318 of the Custom Threats home screen 1300. In some embodiments, the first screen 1400, along with any subsequent screens for creating custom threat rules, are presented as windows, boxes, prompts, or the like, which may overlay other displayed content such as the Custom Threats home screen 1300.

The first screen 1400 includes three alternative controls for defining a participant entity: "User" 1402, "Device" 1404, and "Session" 1406. The subsequent display screens can vary depending on which entity the UI user selects, and the criteria for each selected entity can be the same, similar, or completely for all the entities. In some embodiments, the criteria for each entity type in the screen after this "Select Participant" screen are completely different. The criteria in the threat conditions screen are the same irrespective of the custom threat rule entity type because they relate to anomaly selection criteria (e.g., anomaly filter), not entity selection criteria.

As shown, the User 1402 control has been selected by the UI user. The subsequent screens for creating the new custom threat rule are associated with the user entity. The user can select the "Cancel" link 1408 at any time to cancel the current process. Once an entity is selected, the UI user can select the Next control to move to the second screen, to input additional criteria for the new custom threat rule.

FIG. 15 is an illustrative view of a second screen 1500 used by the UI user to set filters for the new custom threat rule according to some embodiments of the present disclosure. The UI user can select one or more filters and define one or more criteria for each selected filter. The second screen 1500 includes a list of "User Filters" including Anomalies Count, City, Country, HR record, OU, Specific Users, State, Threat Counts, User Status, and User Watchlists. As shown, the UI user selected the Anomalies Count filter. The UI user can then set criteria for the Anomalies Count, including selecting a threshold 1504 equal to greater, less, equal, or combinations thereof and inputting a value in a value field 1506. For example, the UI user can input ">=" a threshold 1504 and 25 in the value field 1506 to define the criteria for the Anomalies Count filter. The UI user can select Cancel 1508 to cancel the current process, select Back 1510 to present the first screen 1400, or select Next 1512 to present a third screen, to input additional criteria for the new custom threat rule.

FIGS. 16A through 16C are illustrative views of a third screen 1600 for a UI user to define conditions for the new custom threat rule according to some embodiments of the present disclosure. In particular, FIG. 16A is an illustrative view of a third screen to set conditions for the new custom threat rule. The UI user can add conditions for anomalies of the custom threat rule, and specify threat time intervals.

As shown, the third screen 1600 includes selectable Anomaly Types 1602, Count 1604 and Filters 1606 for a selected anomaly type. An anomaly type may include, for example, any of those shown in the table of FIGS. 2A and 2B. A user can add any number of conditions by clicking "Add Condition" 1608. Then the user can repeat these steps any number of times to define an anomaly pattern. Moreover, in some embodiments, the user can configure the custom threat rule to preserve the order for the conditions. As such, the anomaly types are processed in order.

A user can optionally specify time related conditions for the anomaly patterns. Examples include an anomalies interval, and optional maximum threat duration and threats gap attributes of the anomaly patterns as described above. In particular, each filter of an anomaly pattern may specify multiple anomaly types. Each condition is a distinct anomaly filter with any number of attributes. The anomaly type is one of the attributes that can be used in an anomaly filter. And multiple anomaly types can be specified for the same filter.

As shown, the conditions can have time criteria including an "Anomalies Interval" 1610, "Max Threat Duration" 1612, and "Threats Gap" 1614. The anomalies interval condition sets the minimum anomalies of every set of a pattern that have to occur at most within the anomalies interval. If the anomalies are detected but the interval between the first and the last is greater than the anomalies interval, then the pattern is not matched. The new custom threat rule is executed on a daily basis and in every execution it processes the anomalies generated between the time of the execution (t1) and t1-anomalies_interval. For example, if the period t1-anomalies_interval is less than 24 hours, then the processed period becomes [t1, t1-24 hours].

If in yesterday's execution the custom threat rule's pattern was detected and threat T1 was raised, then if in today's execution maybe the same pattern is detected, the custom threat rule can either raise a new threat T2 or merge the anomalies of new occurrence of the pattern to threat T1. This decision is based on the Max Threat Duration 1612 and Threats Gap 1614 conditions.

In particular, for the maximum threat duration, if the new anomalies found today were added to T1 without violating the maximum threat duration constraint (i.e., without making T1 last longer that this duration), then they will be added to T1 and T2 will not be generated. The duration of a threat can be defined as the time period between its earliest and its latest anomalies. For the threats gap, if in today's run more anomalies are found that that satisfy one of the pattern's filter, then the process keeps adding them to the last found threat T1 as long as the chronological gap between every such anomaly and the previous one is smaller than the threats gap.

The UI user can select Cancel 1616 to cancel the current process or select Back 1618 to present the second screen 1500 or, once any number of conditions have been set, select Next 1620 to present a fourth screen, to input additional criteria for the new custom threat rule.

FIG. 16B is another illustrative view of the third screen 1600 for the UI user to set conditions for the new custom threat rule. The view of the third screen 1600 includes a dropdown list 1622 for the Anomaly Types 1602 including a number of selectable options. The dropdown list 1622 also includes a search field that allows the UI user to input an anomaly type included in a library of anomaly types that could be selected as a threat condition.

FIG. 16C is another illustrative view of the third screen 1600 for the UI user to set conditions for the new custom threat rule. The conditions shown include a "Blacklisted Application" with a count of 2 for a first condition 1624, and a "Download From Internal Server" with a count of 1 for a second condition 1626.

In some embodiments, a user could select two anomaly types in the same condition and the count would apply to both. For example, this means "at least x number of anomalies of the first OR the second anomaly type." In some embodiments, custom threat rules do not specify any anomaly type in their conditions. Instead, they use other attributes of the anomalies such as the score, for example, select anomalies of any type with a score greater than 8. Hence, the anomaly type can be nothing more than one of the fields to use in the filter or condition.

A "Preserve Order" 1628 control is enabled because the custom threat rule includes multiple threat conditions. The Preserve Order 1628 control can be toggled on to preserve the order for processing the threat conditions, or toggled off to not preserve the order. As shown, the Preserve Order 1628 is toggled on. Further, the Anomalies Interval is set to 1 minute. Also shown is a graphic-x control 1630 for each condition which, upon selection by the UI user, will delete the condition. The UI user can select Next 1620 to present the fourth screen.

Figure 17C:
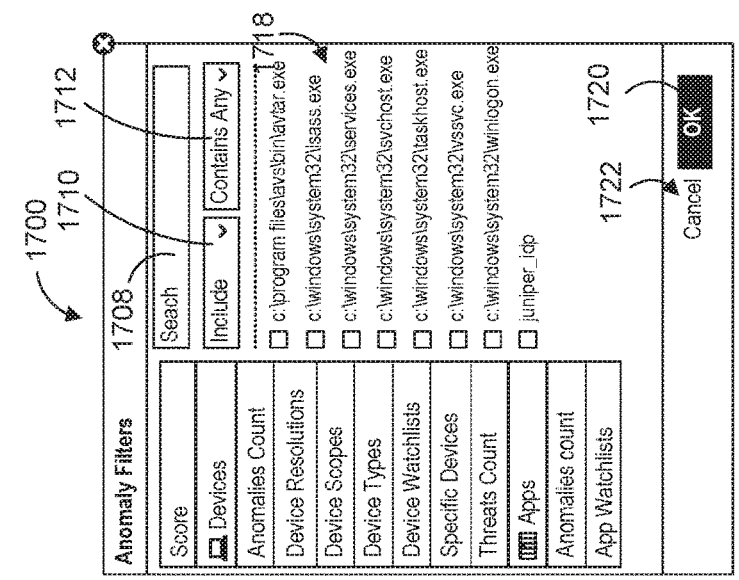
FIG. 17C is another illustrative view of the user interface screen display to define filters for a custom threat rule.

As indicated above, the anomaly type 1602 can be associated with one or more filters 1606, which are customizable by the UI user. For example, FIGS. 17A through 17C are illustrative views of an anomaly filter screen 1700 to set the anomaly filters 1706 for the conditions according to some embodiments of the present disclosure.

Figure 17B:
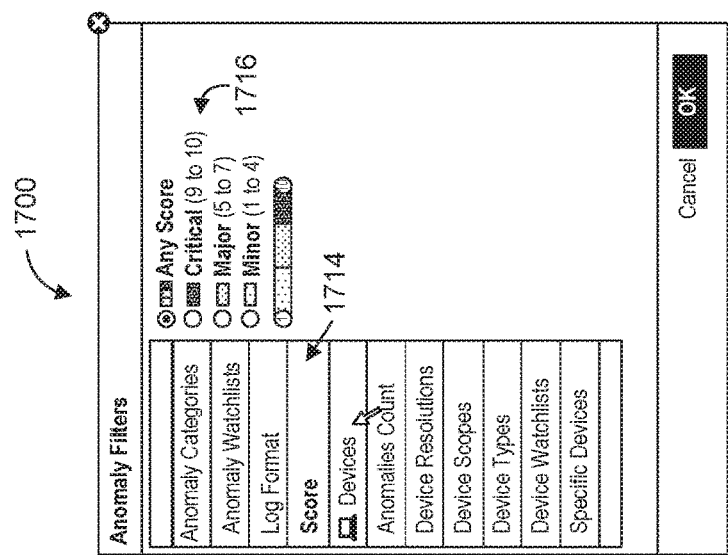
FIG. 17B is another illustrative view of the user interface screen display to define filters for a custom threat rule.
Figure 17A:
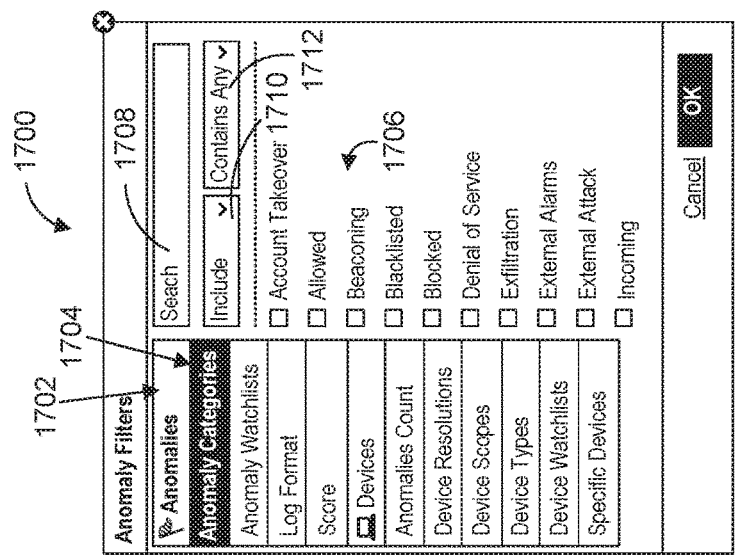
FIG. 17A is an illustrative view of a user interface screen display to define filters for a custom threat rule.

In particular, FIG. 17A is an illustrative view of the anomaly filters screen 1700 for the UI user to set anomaly filters for the new custom threat rule according to some embodiments of the present disclosure. As shown, an anomaly filter 1702 may include an Anomaly Category, Anomaly Watchlist, Log Format, or Score. A filter by device may include Anomalies Count, Device Resolutions, Device Scopes, Device Types, Device Watchlists, Specific Devices, and Threat Counts. A filter by application (e.g., "app") may include Anomalies Count, App Watchlists, Specific apps, and Threat Counts.

As shown, the UI user selects an Anomaly Categories filter 1704. The UI user can then select to include one or more categories 1706 including Account Takeover, Allowed, Beaconing, Blacklists, Blocked, Denial of Service, Exfiltration, External Alarms, External Attack, Incoming, and the like. Also shown are a search field 1708 to facilitate searching for anomaly categories and optional constrains 1710 and 1712 to limit or target the search for an anomaly category input in the search field 1708.

FIG. 17B is another illustrative view of the anomaly filters screen 1700 for the UI user to set anomaly filters for the new custom threat rule. As shown, the UI user selected a Score filter 1714, the UI user is then prompted with score controls 1716 to designate an anomaly score value or range between 0 and 10, with 0 being the least anomalous and 10 being the most anomalous.

FIG. 17C is another illustrative view of the anomaly filters screen 1700 to set anomaly filters for the new custom threat rule. Here, the UI user selected an apps filter, and was prompted to select from one or more applications 1718. Also shown is the search field 1708 to facilitate searching for applications and optional constrains 1710 and 1712 to limit or target the search for applications input in the search field 1708. Once any number of anomaly filters have been set, the UI user can select OK 1722 to present the fourth screen, or can select Cancel 1722 at any time to cancel the current process.

Figures 18A, 18B, 18C:
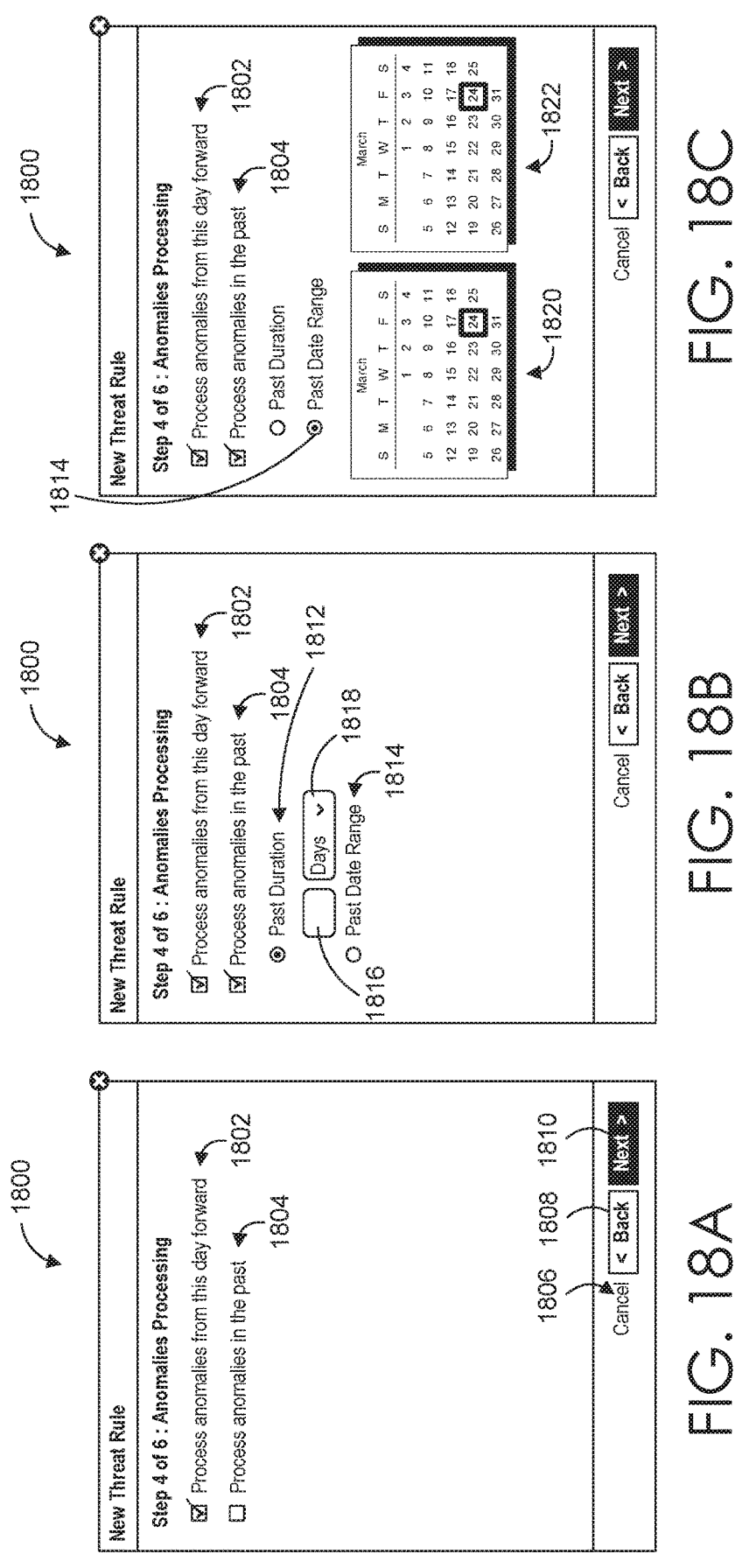

FIG. 18A is an illustrative view of a fourth screen 1800 for the UI user to set anomaly processing for the new custom threat rule. The UI user can select a scope of anomaly processing for the new custom threat rule including "Process anomalies from this day forward" 1802 and/or "Process anomalies from the past 1804. As shown, the UI user has selected to Process anomalies from this day forward 1802. The UI user can select Cancel 1806 to cancel the current process or select Back 1808 to present the third screen 1600 or, when an anomaly processing has been set, select Next 1810 to present a fifth screen, to input additional attributes for the new custom threat rule.

FIG. 18B is another illustrative view of the fourth screen 1800 to set anomaly processing for a new custom threat rule according to some embodiments of the present disclosure. As shown, both the processing anomalies from the present day forward 1802 and processing anomalies from the past 1804 have been selected. As a result of selecting processing at least some anomalies from the past 1804, controls are enabled for a "Past Duration" 1812 and a "Past Date Range" 1814. As shown, the Past Duration 1812 has been selected and, in response, a field to input a value has been enabled as well as a field to input a time unit.

FIG. 18C is another illustrative view of the fourth screen 1800 for the UI user to set anomaly processing for the new custom threat rule. As shown, both the processing anomalies from the present day forward 1802 and processing anomalies from the past 1804 have been selected. Further, the Past Date Range 1814 has been selected and, as a result, a Start Date calendar control 1820 and an End Date calendar control 1822 are enabled. The UI user can set the start date by selecting from the Start Date calendar control 1820, and set an end date by selecting from the End Date calendar control 1822. The UI user can then select Next 1810 to move to the fifth screen, to input additional criteria that defines the custom threat rule.

Figures 19A, 19B, 19C:
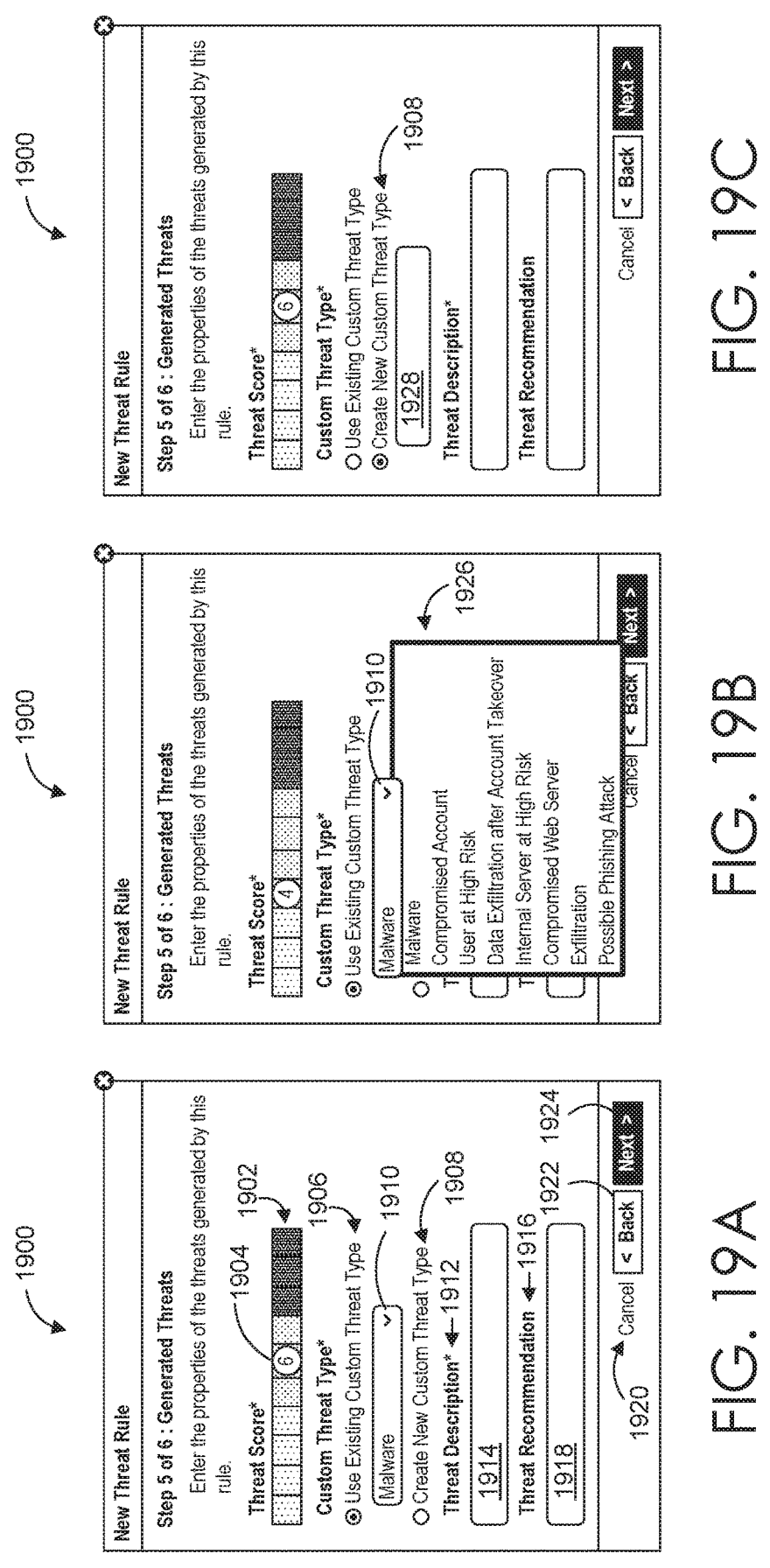

FIGS. 19A through 19C are illustrative views of a fifth screen 1900 for the UI user to set properties for generated threats based on the new custom threat rule. In particular, FIG. 19A is an illustrative view of the fifth screen 1900 for the UI user to set generated threats for the new custom threat rule.

The UI user can enter the properties of the threats generated by the new custom threat rule. A "Threat Score" 1902 control includes a knob 1904 that can slide between left and right of the Threat Score 1902 control. By moving the knob 1904 to the left, the custom threat rule is given a lower score. By moving the knob 1904 to the right, the custom threat rule is given a higher score. The numerical value of the score is presented on the knob 1904 to further help the UI user set the desired threat score. For example, the threats can be assigned a score ranging between 0 and 10, with 0 being the least threatening and 10 being the most threatening.

The fifth screen 1900 also includes two options for "Custom Threat Type" including "Use Existing Custom Threat Type" 1906 and "Create New Custom Threat Type" 1908. As shown, the Use Existing Custom Threat Type 1906 is selected and, as a result, a control for alternatively selectable options 1910 is enabled. The fifth screen 1900 also includes a "Threat Description" 1912 and corresponding text box 1914, which allows the UI user to input a description of the threat. A "Threat Recommendation" 1916 has a corresponding text box 1918, which allows the UI user to input a recommendation for responding to the threat. The content input by the UI user for the Threat Description 1912 and Threat Recommendation 1916 can be presented to a UI user when threats are generated as a way to explain what the threat is, and explain how one should respond to the threat. The UI user can select Cancel 1920 to cancel the current process or select Back 1922 to present the fourth screen 1800 or, after the threats criteria has been set, select Next 1924 to present a sixth screen, to input additional criteria for the new custom threat rule.

FIG. 19B is another illustrative view of the fifth screen 1900 to set properties for threats for the new custom threat rule. By selecting the alternatively selectable options 1910, a window 1926 is presented that includes the alternatively selectable options such as Malware, Compromised Account, User at High Risk, Data Exfiltration after Account Takeover, Internal Server at High Risk, Compromised Web Server, Exfiltration, and Possible Phishing Attack.

FIG. 19C is another illustrative view of the fifth screen to set properties for threats for the new custom threat rule. As shown, the Create New Custom Threat Type 1908 has been selected. A corresponding text box 1918 has been enabled to allow the UI user to create a custom new threat type that includes a custom description and can include threat recommendations instructive of how to handle the threat.

FIG. 20 is an illustrative view of a sixth screen 2000 to set properties for a new custom threat rule. The UI user can name the new custom threat rule, provide an optional description, and store the new custom threat rule in memory. As shown, the "Rule Name" 2002 has an associated text box 2004 for the UI user to input the name of the new custom rule. The "Rule Description" 2006 has an associated text box 2008 for the UI user to input a description of the new custom threat rule.

The UI user can select Cancel 2010 to cancel the current process or select Back 2012 to present the fifth screen 1900 or, once the rule name has been set, select OK 2014 to present complete the process for creating a new custom threat rule, which will subsequently be applied to event data of the data processing system. The name and description can be used later when identifying the threat rule for subsequent editing or deletion.

4.1.2. User Interface for Editing Custom Threat Rules

The UI user can subsequently select the new custom threat rule from a library of existing rules and edit or delete the selected rule. For example, referring back to the Custom Threats screen 1300, a shortcut icon 1316 for editing the custom threat rule can be selected. The first screen 1400 is then presented to the UI user, who can navigate between the various screens of FIGS. 14 through 20 by selecting Next or Back controls. Hence, the user can skip to any of the screens use to create the custom threat rule, and edit the criteria that defines the custom threat rule. The edited custom threat rule is stored in memory.

For example, FIG. 21 is an illustrative view of the fourth screen 1800 for the UI user to edit properties of a custom threat rule according to some embodiments of the present disclosure. The properties have previously been input for each control. Thus, the UI user can change, add, or delete criteria to modify the custom threat rule. The UI user can modify any of the criteria in the same manner described with reference to FIGS. 14 through 20.

4.2. User Interface for Anomaly Action Rules

Figure 22:
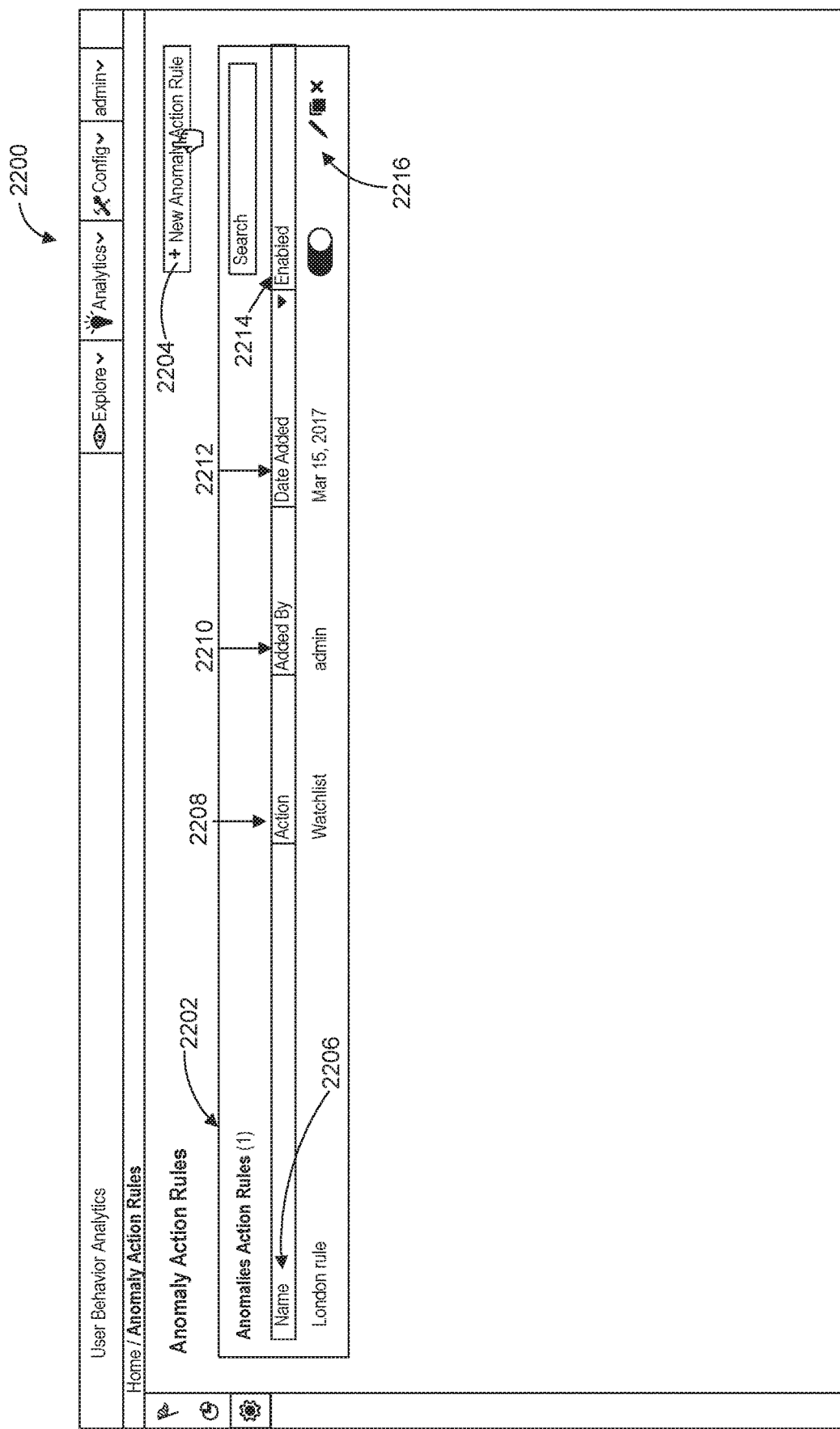
FIG. 22 is an illustrative view of an "Anomalies Action Rules" home screen user interface screen display.

FIG. 22 is an illustrative view of an "Anomaly Action Rules" home screen 2200. The Anomaly Action Rules home screen 2200 is similar to the Custom Threats screen 1300 of FIG. 13. For example, the Anomaly Action Rules home screen 2200 includes an Anomaly Action Rules listing 2202 of anomaly action rules. The Anomaly Action Rules home screen 2200 also includes an "Anomaly Action Rule" control 2204 that, upon its selection, opens one of a series of screens to guide the UI user through a process to create a new anomaly action rule.

As shown, the Anomaly Action Rules list 2202 includes one anomaly action rule. The entry for this the "Anomaly Action Rules" list 2202 includes a "Name" 2206, "Action" 2208, "Added By" 2208, "Date Added" 2208, "Enabled" 2214, and shortcut icons 2216 to modify the anomaly action rule.

For example, for the first anomaly action rule entry, the Name 2206 is "London Rule." The rule Action 2208 is watchlist. The Added By 2210 indicates that the "admin" user added the custom threat rule, and the Date Added indicates that the anomaly action rule was added on Mar. 15, 2017. The Enabled 2214 is a control that allows the UI user to enable or disable the anomaly action rule by toggling the control. The UI user can move each Enable control individually to disable a respective anomaly action rule. Lastly, the shortcut icons 2216 can be selected by the UI user to modify the anomaly action rule in one of three ways. In particular, selecting the graphic icon that resembles a pencil allows the UI user to edit the anomaly action rule. Selecting the overlapping graphic icons allows the UI user to edit or add comments for the anomaly action rule. Lastly, selecting the graphic-x shortcut removes the anomaly action rule from the Anomaly Action Rules list 2202.

Figure 23:
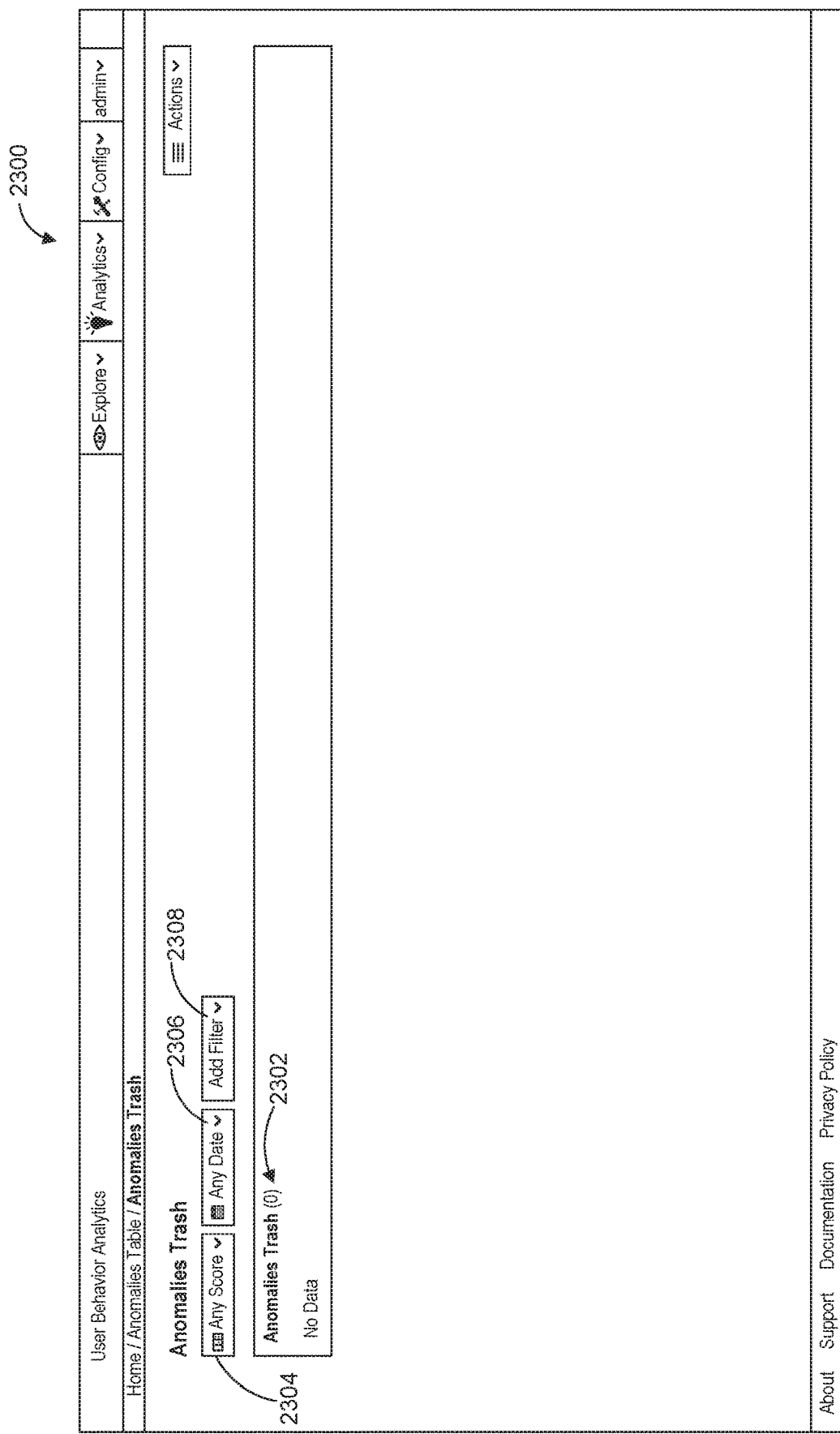
FIG. 23 is an illustrative view of an "Anomalies Trash" user interface screen display.

FIG. 23 is an illustrative view of an "Anomalies Trash" screen 2300 according to some embodiments of the present disclosure. As shown, the Anomalies Trash screen 2300 includes a list of anomalies that have been deleted from use. Since no anomalies have been deleted, the Anomalies Trash list 2302 has no data (i.e., is empty). The Anomalies Trash screen 2300 include filter options such as a score or range of score value 2304, and a date or range of dates value 2306. The Anomalies Trash screen 2300 also includes an "Add Filter" 2308 control, which allows the UI user to add more filters from a library of filters. The filters can be used to filter the anomalies in the trash. For example, the UI user can filter the discarded anomalies by a score or range of scores input into the score control 2304.

4.2.1. User Interface for Creating Anomaly Action Rules

The ability to customize anomaly action rules is enabled by the underlying logic of the network security platform as described above. For example, the underlying logic includes processes that facilitate creating new anomaly action rules or editing existing anomaly action rules. The processes reduce the customization of complex anomaly action rules into a series of defined steps and sub-steps that guide a user to create anomaly action rules.

To further reduce the cognitive burden on users to customize anomaly action rules, the disclosed embodiments include a series of screens of a GUI presented in an easy-to-use format. FIGS. 24A through 26 illustrate an example of a series of screens for creating new anomaly action rules. In particular, these figures illustrate screens enabled by the underlying logic described with respect to FIG. 5.

The example underlying logic includes a three-step process to create new anomaly action rules. Each step has a corresponding one of a series of three screens illustrated in FIGS. 24A through 26, respectively. An anomaly action rule is created in accordance with the series of predefined steps and sub-steps that are presented on the series of UI screens of FIGS. 24A through 26. Each screen has controls or fields for the UI user to input criteria defining the anomaly action rule. After inputting a minimal amount of necessary criteria, an anomaly action rule can be stored in a data store. Hence, the UI facilitates the input of criteria to reduce the complex process of customizing anomaly action rules into easy-to-use interactive screens.

Although the illustrated embodiment includes at least three screens and supporting underlying logic, this disclosure is not so limited. Rather, some embodiments may include fewer steps, more steps, a different order or combination of steps, could allow the UI user to skip steps, and/or could automatically populate certain steps with data. As such, the disclosed embodiments include any number of steps and corresponding screens that are necessary and sufficient to define anomaly action rules.

FIG. 24A is an illustrative view of a first screen 2400 for creating an anomaly action rule. The first screen 2400 can be displayed in response to selection of the Anomaly Action Rule 2204 control of the Anomaly Action Rules home screen 2200. In some embodiments, the first screen 2400, along with any subsequent screens for creating anomaly action rules, are presented as windows, boxes, prompts, or the like, which may overlay other displayed content such as the Anomaly Action Rules home screen 2400.

The first screen 2400 includes three alternative controls for setting a "Rule Action" 2402: "Add Anomalies to Watchlist" 2404, "Change Anomalies Score" 2406, and "Delete Anomalies" 2408. Selecting a Rule Action 2402 can enable other controls or fields for input by the UI user to add criteria to the selected rule action. As shown, Change Anomalies Score 2406 has been selected by the UI user. The selection of this action rule, causes the first screen 2400 to display options for setting the score: Absolute Score 2410 and Relative Score 2412. As shown, Absolute Score 2410 has been selected by the UI user. The selection of this score option, causes the first screen 2400 to display a score control including a slider 2414 knob 2414 that can slide left or right. By moving the knob 2414 to the left, the anomaly action rule is given a lower score. By moving the knob 2414 to the right, the anomaly action rule is given a higher score. Further, the numerical value of the score is presented on the knob 2414 to further help the UI user set the desired anomaly action score. For example, the anomaly actions can be assigned a score ranging between 0 and 10, with 0 being the lowest value and 10 being the highest value.

The first screen 2400 includes a "Rules Scope" 2416 for the UI user to set the application of the anomaly action rule to "Apply to Future Anomalies" 2418 or to "Apply to Future and Existing Anomalies" 2420. If the user selects to apply the anomaly action rule to future anomalies, then the anomaly action rule will be applied to all anomalies from the current date. If the user selects to apply the anomaly action rule to future and existing anomalies, then the anomaly action rule will be applied to those anomalies already detected in addition to any future anomalies. The UI user can select 2422 to cancel the current process or, upon entering a Rule Action 2402, select Next 2424 to present a second screen, to input additional criteria for the anomaly action rule.

FIG. 24B is another illustrative view of the first screen 2400 for creating the new anomaly action according to some embodiments of the present disclosure. As shown, selection of the "Add Anomalies to a watchlist" 2404 has been selected. The UI user can select from one or more available watchlists 2405 including Anomaly Watchlist, False Positive, Important, Reviewed.

FIG. 24C is another illustrative view of the first screen 2400 for creating the new anomaly action according to some embodiments of the present disclosure. In contrast to FIG. 24A, this view has Relative Score 2412 selected rather than the Absolute Score 2410 selected. In response, the first screen 2400 presents a control for selecting an operation 2426 with alternative values of "add" or "subtract," and a numerical value control 2428 for the selected operation 2426. As shown, the numerical value control 2428 has been selected such that a dropdown list 2430 including selectable numerical values is presented to the UI user.

FIG. 24D is another illustrative view of the first screen 2400 for creating the new anomaly action according to some embodiments of the present disclosure. In contrast to FIG. 24A, this view has the Delete Anomalies 2408 selected rather than the Change Anomalies Score 2406 selected. In response, the first screen 2400 presents a delete control 2432 including options to Move to Trash or Delete Permanently presented in a dropdown list 2434. If the UI user selects Move to Trash as the Rule Action 2402, then the security platform will discard a matching anomaly to a trash memory, which can be retrieved later and is not permanently deleted from memory. If the UI user selects Delete Permanently as the Rule Action 2402, then the security platform discards a matching anomaly permanently, which cannot be retrieved later because it is not stored in memory. After selecting Next 2424, the second screen is presented to the UI user for input of additional criteria for the new anomaly action rule.

Figures 25A, 25B, 25C:
FIG. 25A is an illustrative view of a second user interface screen display to define filters for an anomaly action rule.
FIG. 25B is another illustrative view of the second user interface screen display to define filters for an anomaly action rule.
FIG. 25C is another illustrative view of the second user interface screen display to define filters for an anomaly action rule.

FIG. 25A is an illustrative view of a second screen 2500 for the UI user to set filters for the new anomaly action rule. As shown, an anomaly filter 2502 includes an Anomaly Category, Anomaly Type, Anomaly Watchlists, Log Format, and Score. FIG. 25B is another illustrative view of the second screen 2500 for the UI user to set filters for the new anomaly action according to some embodiments of the present disclosure. FIG. 25B shows the list of Anomalies 2506 scrolled to include additional Anomalies 2502. FIG. 25C is another illustrative view of the second screen 2500 for a UI to set filters for the new anomaly action. Compared to FIG. 25A, FIG. 25C shows the list of Anomalies 2506 scrolled down to include Apps and Domains.

Collectively, FIGS. 25A through 25C show an Anomalies 2502 filter for User anomalies including Anomalies Count, Cities, Countries, HR Record, OUs, Specific User, States, Threats Count, and User Status, and Threats Count. An Anomalies 2502 filter for Apps anomalies includes Anomalies Count, App Watchlists, Specific Apps, and Threats Count. Lastly, an Anomalies 2502 filter for Domains anomalies including Anomalies Count, Domain Watchlists, Specific Domains, and Threat Counts.

Referring back to FIG. 25A, the UI user selected the Anomaly Categories filter 2504. The UI user can then select to include one or more categories 2506 including Account Takeover, Allowed, Beaconing, Blacklists, Blocked, Denial of Service, Exfiltration, External Alarms, and External Attack. A search field 2508 accepts keywords to search for anomaly categories. The keywords can be filtered with selectable options 2510 and 2512 to search for anomaly categories as defined based on a combination of the keywords input in the search field 2526 filtered by options 2510 and 2512. The UI user can select Cancel 2514 to cancel the current process, select Back 25156 to present the first screen 2400, or select Next 2518 to present a third screen, to input additional criteria for the anomaly action rule. In some embodiments, an anomaly type is selected. In response to the selection, the user can then click on a funnel graphic that will appear next to the name of the type (not shown). The window that appears contains attributes that apply only to the selected anomaly type.

In contrast to FIG. 25A, the UI user selected a "Specific Users" 2520 in FIG. 25B for the anomalies 2502. In response, the second screen 2500 displays a list 2522 of selectable Specific Users. The search field 2508 accepts keywords to search for Specific Users. The keywords can be filtered with selectable options 2510 and 2512 to search for Specific Users as defined based on a combination of the keywords input in the search field 2526 filtered by options 2510 and 2512.

Figure 26:
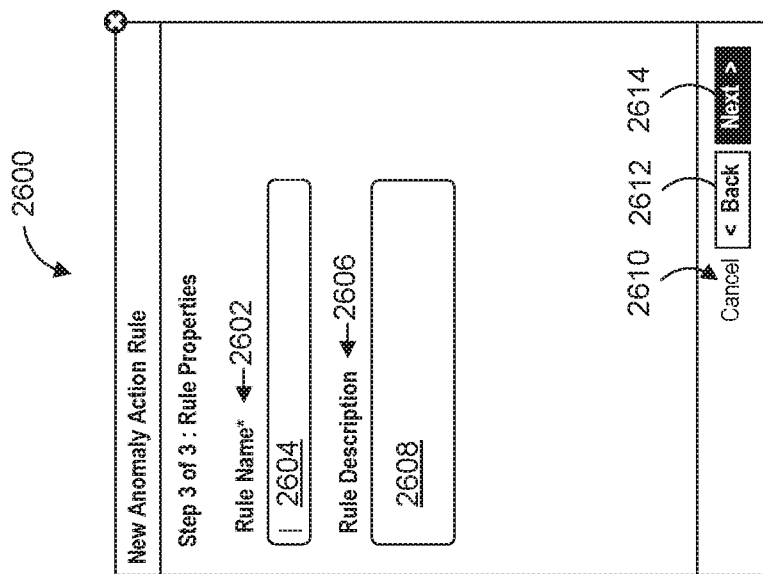
FIG. 26 is an illustrative view of a third user interface screen display to define properties of an anomaly action rule.

FIG. 26 is an illustrative view of a third screen 2600 to set properties for the new anomaly action rule. The UI user can name the new anomaly action rule, provide an optional description, and store it in memory such as a database. As shown, the "Rule Name" 2602 has an associated text box 2604 for the UI user to input the name of the new custom rule. The "Rule Description" 2604 has an associated text box 2606 for the UI user to input a description of the new anomaly action rule.

The UI user can select Cancel 2608 to cancel the current process or select Back 2610 to present the second screen 2500 or, once the rule name has been set, selecting OK 2612 to complete the process for creating a new anomaly action rule, which will subsequently be applied to event data by the data processing system. The name and optional description can be used later when identifying the anomaly action rule for subsequent editing or deletion, as described next.

4.2.2. User Interface for Editing Anomaly Action Rules

The UI user can subsequently select an anomaly action rule from a library of existing anomaly action rules, and edit or delete the selected anomaly action rule. For example, referring back to the Anomaly Action Rules home screen 2200, a shortcut icon 2216 for editing the custom rule can be selected by the UI user. The first screen 2400 is then presented to the UI user, who can navigate to the second screen 25 and third screen 26 by selecting Next controls. Hence, the user can skip to a screen used to create the anomaly action rule, and edit the criteria that defines the anomaly action rule. The edited anomaly action rule is stored in a data store.

For example, the criteria of any of the first screen 2400, second screen 2500, or third screen 2600 can be edited by the UI user. Thus, the UI user can change, add, or delete criteria to modify the anomaly action rule. That is, the UI user can modify any of the criteria in the same manner described with reference to FIGS. 24A through 26.

5.0. Computing System Architecture

Figure 27:
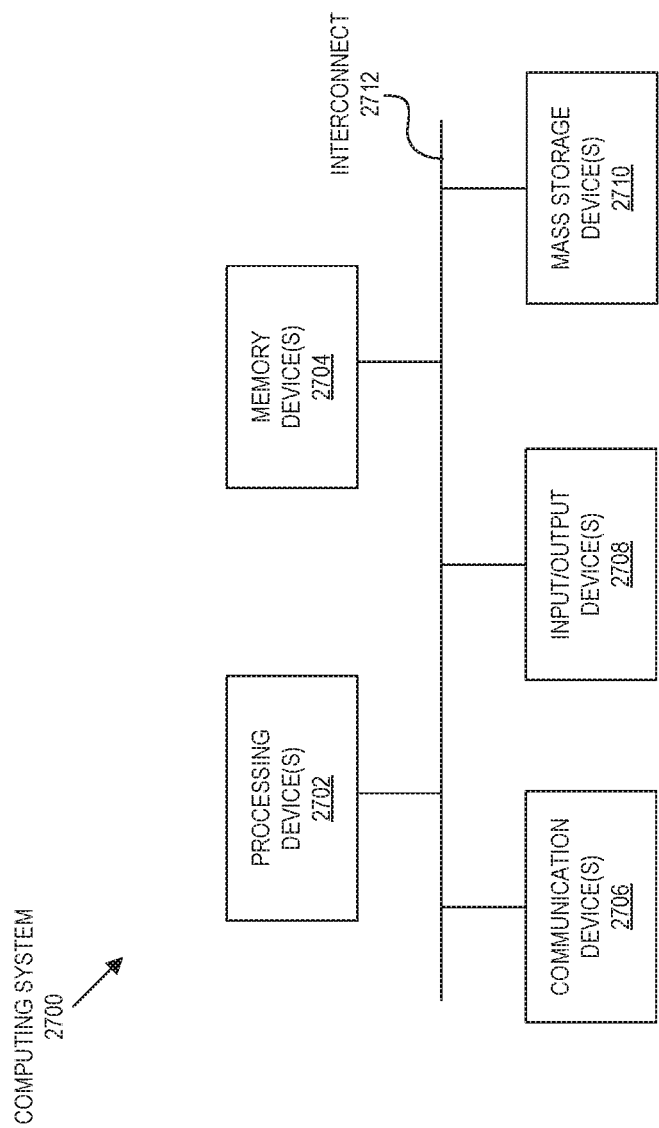
FIG. 27 is a block diagram illustrating a high-level example of hardware architecture of a computing system.

FIG. 27 is a block diagram illustrating a high-level example of a hardware architecture of a computing system in which an embodiment may be implemented. For example, the hardware architecture of a computing system 2700 can be used to implement any one or more of the functional components described herein including a forwarder, indexer, search head, data store, or any computing resource. In some embodiments, one or multiple instances of the computing system 2700 can be used to implement the technologies described herein, where multiple such instances can be coupled to each other via one or more networks.

The processes and logic flows described in this specification can be performed by one or more programmable processors executing one or more computer programs to perform functions by operating on input data and generating output. For example, the computing system 2700 includes one or more processing devices 2702, one or more memory devices 2704, one or more communication devices 2706, one or more input/output (I/O) devices 2708, and one or more mass storage devices 2710, all coupled to each other through an interconnect 2712.

The interconnect 2712 may be or include one or more conductive traces, buses, point-to-point connections, controllers, adapters, and/or other conventional connection devices. Each of the processing devices 2702 controls, at least in part, the overall operation of the processing of the computing system 2700 and can be or include, for example, one or more general-purpose programmable microprocessors, digital signal processors (DSPs), mobile application processors, microcontrollers, special purpose logic circuitry, e.g., a field programmable gate array (FPGA) or an application specific integrated circuit (ASIC), or the like, or a combination of such devices.

Each of the memory devices 2704 can be or include one or more physical storage devices, which may be in the form of random access memory (RAM), read-only memory (ROM) (which may be erasable and programmable), flash memory, miniature hard disk drive, or other suitable type of storage device, or a combination of such devices. Each mass storage device 2710 can be or include one or more hard drives, digital versatile disks (DVDs), flash memories, or the like. Each memory device 2704 and/or mass storage device 2710 can store (individually or collectively) data and instructions that configure the processing device(s) 2702 to execute operations to implement the techniques described above.

Processors suitable for the execution of a computer program include, by way of example, both general and special purpose microprocessors, and any one or more processors of any kind of digital computer (e.g., processing devices 2702). Generally, a processor will receive instructions and data from a read-only memory or a random access memory or both. The essential elements of a computer are a processor for performing instructions and one or more memory devices for storing instructions and data. Generally, the computer system 2700 will also include, or be operatively coupled to receive data from or transfer data to, or both, one or more mass storage devices for storing data, e.g., magnetic, magneto optical disks, or optical disks. However, a computer need not have such devices.

Each communication device 2706 may be or include, for example, an Ethernet adapter, cable modem, Wi-Fi adapter, cellular transceiver, baseband processor, Bluetooth or Bluetooth Low Energy (BLE) transceiver, or the like, or a combination thereof. Depending on the specific nature and purpose of the processing devices 2702, each I/O device 2706 can be or include a device such as a display (which may be a touch screen display), audio speaker, keyboard, mouse or other pointing device, microphone, camera, etc. Note, however, that such I/O devices 2706 may be unnecessary if the processing device 2702 is embodied solely as a server computer.

The computing system 2700 can include a client or server. A client and server are generally remote from each other and typically interact through a communication network. The relationship of client and server arises by virtue of computer programs running on the respective computers and having a client-server relationship to each other. In the case of a client device, the communication devices(s) 2706 can be or include, for example, a cellular telecommunications transceiver (e.g., 3G, LTE/4G, 5G), Wi-Fi transceiver, baseband processor, Bluetooth or BLE transceiver, or the like, or a combination thereof. In the case of a server, the communication device(s) 2706 can be or include, for example, any of the aforementioned types of communication devices, a wired Ethernet adapter, cable modem, DSL modem, or the like, or a combination of such devices.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus.

A software program or algorithm, when referred to as "implemented in a computer-readable storage medium," includes computer-readable instructions stored in a memory device (e.g., memory device(s) 2704). A processor (e.g., processing device(s) 2702) is "configured to execute a software program" when at least one value associated with the software program is stored in a register that is readable by the processor. In some embodiments, routines executed to implement the disclosed techniques may be implemented as part of OS software (e.g., MICROSOFT WINDOWS® or LINUX®) or a specific software application, algorithm component, program, object, module, or sequence of instructions referred to as "computer programs."

The computer readable medium can be a machine readable storage device, a machine readable storage substrate, a memory device, a composition of matter effecting a machine readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a data store management system, an operating system, or a combination of one or more of them, a propagated signal is an artificially generated signal, e.g., a machine generated electrical, optical, or electromagnetic signal, that is generated to encode information for transmission to suitable receiver apparatus.

A computer program (also known as a program, software, software application, script, or code) typically includes one or more instructions set at various times in various memory devices of a computing device, which, when read and executed by at least one processor (e.g., processing device(s) 2702), will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium (e.g., the memory device(s) 2704).

A computer program can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., on or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The computer system 2700 can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor (e.g., processing devices 2702) and the memory (e.g., memory device 2704) can be supplemented by, or incorporated in, special purpose logic circuitry.

To provide for interaction with a user, architecture provider or reviewer, embodiments of the subject matter described in this specification can be implemented with a display device of the I/O devices 2708, e.g., a CRT (cathode ray tube) to LCD (liquid crystal display) monitor, for displaying information to the user and a keyboard and a pointing device, e.g., a mouse or a trackball, by which the user can provide input to the computer. Other kinds of I/O devices 2708 can be used to provide for interaction with a user, architecture provider or reviewer as well; for example, feedback provided to the user can be any form of sensory feedback, e.g., visual feedback, auditory feedback, or tactile feedback; and input from the user, architecture provider or reviewer can be received in any from, including acoustic, speech, or tactile input.

In some embodiments, the computing system 180 can include a back end component (not shown), e.g., as a data server, or that includes a middleware component, e.g., an application server, or that includes a front end component, e.g., a client computer having a graphical user interface (e.g., metrics-aware UI) or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

While this specification contains many specifics, these should not be construed as limitations on the scope of the invention or of what may be claimed, but rather as descriptions of features specific to particular embodiments of the invention. Certain features that are described in this specification in the context or separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method, comprising:
   receiving user selection of an action for an anomaly action rule, the selected action to be performed on a matching anomaly that satisfies the anomaly action rule, the selected action being from a list including adding the matching anomaly to a watchlist, removing the matching anomaly from the watchlist, changing an anomaly score of the matching anomaly, or deleting the matching anomaly;
   receiving user selection of a filter for the anomaly action rule from among a library of predefined filters, the selected filter defining an attribute of the matching anomaly, the matching anomaly being a detectable variation from an expected pattern of behavior by a computer network entity;
   receiving user input customizing the attribute of the selected filter for the anomaly action rule to filter a particular anomaly;
   configuring the anomaly action rule based on the selected action, the selected filter, and the input customizing the attribute of the selected filter; and
   causing performance of the selected action on the particular anomaly on a computer network, the particular anomaly corresponding to the matching anomaly that matches the customized attribute of the selected filter for anomaly action rule, the computer network including the computer network entity.

2. The method of claim 1, wherein the computer network entity is a user, a device, or a session of the computer network.

3. The method of claim 1, further comprising, prior to receiving the user selection of the filter of the anomaly action rule:
   receiving user input initiating a process for generating the anomaly action rule.

4. The method of claim 1, further comprising:
   storing, in a memory, an entry for each of a plurality of anomaly action rules including the anomaly action rule, each entry including an anomaly action rule name and an action of the anomaly action rule, an identifier of a user that created the anomaly action rule, or a point in time at which the anomaly action rule was created.

5. The method of claim 1, further comprising:
   storing, in a memory, an entry for each of a plurality of anomaly action rules including the anomaly action rule, each entry including an anomaly action rule name and an indication of whether the anomaly action rule is enabled or disabled.

6. The method of claim 1, wherein the selected action is adding the matching anomaly from the watchlist to or removing the matching anomaly from the watchlist such that any anomaly satisfying the anomaly action rule is added to the watchlist or removed from the watchlist, respectively.

7. The method of claim 1, wherein the selected action is changing the anomaly score of the matching anomaly such that a score associated with each anomaly satisfying the anomaly action rule is changed.

8. The method of claim 1, wherein the selected action is changing the anomaly score of the matching anomaly such that a score associated with each anomaly satisfying the anomaly action rule is changed to a designated value.

9. The method of claim 1, wherein the selected action is changing the anomaly score of the matching anomaly such that a score associated with each anomaly satisfying the anomaly action rule is increased by a designated amount.

10. The method of claim 1, wherein the selected action is changing the anomaly score of the matching anomaly such that a score associated with each anomaly satisfying the anomaly action rule is decreased by a designated amount.

11. The method of claim 1, wherein actions in the list include adding the matching anomaly to the watchlist, removing the matching anomaly from the watchlist, changing the anomaly score of the matching anomaly, and deleting the matching anomaly.

12. The method of claim 1, further comprising, prior to configuring the anomaly action rule:
   receiving user input defining a rule scope that is one of:
      applying the anomaly action rule only to unregistered anomalies; or
      applying the anomaly action rule to unregistered and registered anomalies.

13. The method of claim 1, wherein the anomaly action rule is applied only to unregistered anomalies.

14. The method of claim 1, wherein the anomaly action rule is applied to unregistered anomalies and registered anomalies.

15. The method of claim 1, wherein the selected action is deleting the matching anomaly such that any anomaly satisfying the anomaly action rule is deleted.

16. The method of claim 1, wherein the selected action is deleting the matching anomaly such that any anomaly satisfying the anomaly action rule is permanently deleted.

17. The method of claim 1, wherein the selected action is deleting the matching anomaly such that any anomaly satisfying the anomaly action rule is saved to a trash data store, wherein an anomaly saved to the trash data store is recoverable from the trash data store for subsequently detecting a security threat to the computer network.

18. The method of claim 1, wherein the selected action is one of:
   saving anomalies to a trash data store such that any anomaly satisfying the anomaly action rule is saved to the trash data store; and
   permanently deleting any anomaly such that any anomaly satisfying the anomaly action rule is permanently deleted.

19. The method of claim 1, wherein the selected action is deleting the matching anomaly such that any anomaly satisfying the anomaly action rule is saved to a trash data store, the method further comprising:
   restoring an anomaly saved to the trash data store as a basis for identifying a security threat to the computer network.

20. The method of claim 1, wherein the selected filter includes a criterion for the computer network entity.

21. The method of claim 1, wherein the attribute of the selected filter of the anomaly action rule is one of:
- an anomaly category;
- an anomaly type;
- an anomaly watchlist;
- an anomaly log format;
- an anomaly associated with a user of the computer network;
- an anomaly associated with a device of the computer network;
- an anomaly associated with an application of the computer network; or
- an anomaly associated with a domain of the computer network.

22. The method of claim 1, further comprising, prior to configuring the anomaly action rule:
- receiving user input defining a property of the anomaly action rule.

23. The method of claim 1, further comprising, prior to configuring the anomaly action rule:
- receiving user input defining properties of the anomaly action rule, the properties including a rule name and a rule description.

24. The method of claim 1, wherein the selected filter defines the attribute of the matching anomaly and an attribute of an entity of the computer network.

25. The method of claim 1, further comprising:
- storing, in a memory, the anomaly action rule, including information specifying the selected action and the selected filter;
- receiving user input to retrieve the anomaly action rule stored in the memory;
- receiving user input to edit the anomaly action rule;
- storing the edited anomaly action rule in the memory; and
- executing the edited anomaly action rule upon detecting an anomaly on the computer network that satisfies the edited anomaly action rule.

26. The method of claim 1, further comprising, prior to configuring the anomaly action rule:
- receiving user input defining a rule scope that is one of:
  - applying the anomaly action rule only to unregistered anomalies; or
  - applying the anomaly action rule to unregistered and registered anomalies; and
- receiving user input defining a property of the anomaly action rule.

27. The method of claim 1, wherein performance of the selected action comprises executing the selected action in real-time upon detecting the particular anomaly on the computer network that satisfies the anomaly action rule.

28. A computer system, comprising:
- a processor; and
- memory containing instructions that, when executed by the processor, cause the computer system to:
  - receive user selection of an action for an anomaly action rule, the selected action to be performed on a matching anomaly that satisfies the anomaly action rule, the selected action being from a list including adding the matching anomaly to a watchlist, removing the matching anomaly from the watchlist, changing an anomaly score of the matching anomaly, or deleting the matching anomaly;
  - receive user selection of a filter for the anomaly action rule from among a library of predefined filters, the selected filter defining an attribute of the matching anomaly, and the matching anomaly being a detectable variation from an expected pattern of behavior by a computer network entity;
  - receive user input customizing the attribute of the selected filter for the anomaly action rule to filter a particular anomaly;
  - configure the anomaly action rule based on the selected action, the selected filter, and the input customizing the attribute of the selected filter; and
  - cause performance of the selected action on the particular anomaly on a computer network, the particular anomaly corresponding to the matching anomaly that matches the customized attribute of the selected filter for anomaly action rule, the computer network including the computer network entity.

29. A non-transitory machine-readable storage medium storing instructions, an execution of which in a processing system causes the processing system to perform operations, comprising:
- receiving user selection of an action for an anomaly action rule, the selected action to be performed on a matching anomaly that satisfies the anomaly action rule, the selected action being from a list including adding the matching anomaly to a watchlist, removing the matching anomaly from the watchlist, changing an anomaly score of the matching anomaly, or deleting the matching anomaly;
- receiving user selection of a filter for the anomaly action rule from among a library of predefined filters, the selected filter defining an attribute of the matching anomaly, and the matching anomaly being a detectable variation from an expected pattern of behavior by a computer network entity;
- receiving user input customizing the attribute of the selected filter for the anomaly action rule to filter a particular anomaly;
- configuring the anomaly action rule based on the selected action, the selected filter, and the input customizing the attribute of the selected filter; and
- causing performance of the selected action on the particular anomaly on a computer network, the particular anomaly corresponding to the matching anomaly that matches the customized attribute of the selected filter for anomaly action rule, the computer network including the computer network entity.

\* \* \* \* \*